United States Patent
Kim

(10) Patent No.: US 10,029,639 B2
(45) Date of Patent: Jul. 24, 2018

(54) DRIVER ASSISTANCE APPARATUS FOR VEHICLE AND VEHICLE

(71) Applicant: LG ELECTRONICS INC., Seoul (KR)

(72) Inventor: Jeongsu Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/183,058

(22) Filed: Jun. 15, 2016

(65) Prior Publication Data

US 2016/0362080 A1    Dec. 15, 2016

(30) Foreign Application Priority Data

Jun. 15, 2015  (KR) .................. 10-2015-0084462

(51) Int. Cl.
| | | |
|---|---|---|
| *B60R 21/0136* | (2006.01) | |
| *B60R 21/0134* | (2006.01) | |
| *B60R 21/01* | (2006.01) | |

(52) U.S. Cl.
CPC ...... *B60R 21/0136* (2013.01); *B60R 21/0134* (2013.01); *B60R 2021/01252* (2013.01)

(58) Field of Classification Search
CPC ............ B60R 21/0136; B60R 21/0134; B60R 2021/01252; B60R 2021/23107; B60R 21/36; B60R 21/34; G06K 9/00845; G06K 9/00838; G06K 9/00832; G06K 9/00805; G06K 9/2018; G06K 9/00369; B60W 30/08

(Continued)

(56) References Cited

U.S. PATENT DOCUMENTS

| 5,835,613 A | 11/1998 | Breed et al. |
|---|---|---|
| 6,918,459 B2 * | 7/2005 | Breed ................. B60N 2/002 180/282 |

(Continued)

FOREIGN PATENT DOCUMENTS

| CN | 1500045 A | 5/2004 |
|---|---|---|
| CN | 1836939 A | 9/2006 |

(Continued)

OTHER PUBLICATIONS

Extended European Search Report issued in European Application No. 16174360.4 dated Nov. 29, 2016, 7 pages.

(Continued)

*Primary Examiner* — Jaime Figueroa
(74) *Attorney, Agent, or Firm* — Fish & Richardson P.C.

(57) ABSTRACT

A driver assistance apparatus for a vehicle includes an object detection sensor that acquires data in a driving direction of the vehicle or around the vehicle. The driver assistance apparatus also includes a processor that detects, based on the acquired data, an object and determines, based on the acquired data, at least one attribute of the detected object. The processor detects that the vehicle has collided with the object and determines, based on detecting that the object has collided with the vehicle and based on the at least one attribute of the object, whether to perform a hood lift-up or pedestrian protection airbag deployment. The processor further provides a control signal for the hood lift-up or the pedestrian protection airbag deployment based on determining whether to perform the hood lift-up or the pedestrian protection airbag deployment.

20 Claims, 45 Drawing Sheets

(58) Field of Classification Search
USPC .................................. 701/1, 45, 301; 340/435
See application file for complete search history.

(56) References Cited

U.S. PATENT DOCUMENTS

| | | | | |
|---|---|---|---|---|
| 7,543,677 B2* | 6/2009 | Igawa | ................ | B60R 21/0134 180/274 |
| 7,630,806 B2* | 12/2009 | Breed | ................ | B60R 21/0134 180/273 |
| 8,876,157 B2* | 11/2014 | Nilsson | ................ | B60R 21/015 180/271 |
| 9,254,804 B2* | 2/2016 | Wanami | ............ | B60R 21/0134 |
| 2005/0125126 A1* | 6/2005 | Yopp | ................ | B60R 21/013 701/45 |
| 2006/0213714 A1* | 9/2006 | Igawa | ................ | B60R 21/0134 180/274 |
| 2007/0045026 A1* | 3/2007 | Theisen | ............ | B60R 21/0136 180/274 |
| 2007/0112513 A1* | 5/2007 | Mathevon | ........... | B60R 21/0136 701/301 |
| 2007/0162231 A1* | 7/2007 | Schlogl | ............ | B60R 21/0136 701/301 |
| 2007/0222565 A1* | 9/2007 | Kawamata | .......... | B60R 21/0134 340/435 |
| 2007/0228705 A1* | 10/2007 | Rao | ................ | B60R 21/0134 280/735 |
| 2008/0119993 A1* | 5/2008 | Breed | ................ | B60R 21/0134 701/46 |
| 2008/0243342 A1* | 10/2008 | Breed | ................ | B60R 21/0132 701/45 |
| 2009/0143987 A1* | 6/2009 | Bect | ................ | B60R 21/0134 701/301 |
| 2009/0204294 A1* | 8/2009 | Mack | ................ | B60R 21/013 701/45 |
| 2011/0125372 A1* | 5/2011 | Ito | ................ | B60R 21/0132 701/45 |
| 2014/0000974 A1* | 1/2014 | Nilsson | ............... | B60R 21/015 180/274 |

FOREIGN PATENT DOCUMENTS

| | | | | |
|---|---|---|---|---|
| CN | 103507738 A | 1/2014 | | |
| EP | 1176062 A2 * | 1/2002 | ............ | B60R 21/36 |
| EP | 1705078 | 9/2006 | | |
| EP | 2617605 | 7/2013 | | |
| EP | 2679450 | 1/2014 | | |
| GB | 2400352 | 10/2004 | | |
| JP | 2005067404 A | 3/2005 | | |
| WO | 2004089704 | 10/2004 | | |
| WO | 2010142380 | 12/2010 | | |
| WO | 2013/133463 | 9/2013 | | |

OTHER PUBLICATIONS

European Communication pursuant to Article 94(3) EPC in European Application No. 16174360.4, dated Oct. 9, 2017, 7 pages (with English translation).

Chinese Office Action in Chinese Application No. 201610409270.7, dated Feb. 2, 2018, 16 pages.

* cited by examiner

DRIVER ASSISTANCE APPARATUS FOR VEHICLE AND VEHICLE

CROSS-REFERENCE TO RELATED APPLICATION

This application claims an earlier filing date and right of priority to Korean Patent Application No. 10-2015-0084462, filed on Jun. 15, 2015 in the Korean Intellectual Property Office, the contents of which is incorporated herein by reference in its entirety.

TECHNICAL FIELD

The present disclosure relates to a driver assistance apparatus for a vehicle.

BACKGROUND

A vehicle is a machine used for transporting people or goods. An example of a vehicle is a car.

For convenience of vehicle users, vehicles tend to include various sensors and electronic devices. Particularly, various devices for driving convenience of users are under development.

With recent growing interest in self-driving cars, sensors installed in self-driving cars are actively studied. Sensors installed in self-driving cars include object detection sensors such as cameras, infrared sensors, radar, GPS, lidar, gyroscopes and the like. Among such sensors, the camera plays an important role as a sensor functioning as human eyes.

SUMMARY

Systems and techniques are disclosed herein that enable adaptive deployment of safety features in a vehicle.

In one aspect, a driver assistance apparatus for a vehicle includes an object detection sensor configured to acquire data in a driving direction of the vehicle or around the vehicle. The driver assistance apparatus also includes a processor configured to detect, based on the acquired data, an object and determine, based on the acquired data, at least one attribute of the detected object. The processor is further configured to detect that the vehicle has collided with the object and determine, based on the detection that the object has collided with the vehicle and the at least one attribute of the object, whether to perform at least one of hood lift-up or pedestrian protection airbag deployment. The processor is further configured to provide a control signal for at least one of the hood lift-up or the pedestrian protection airbag deployment based on the determination of whether to perform the at least one of the hood lift-up or the pedestrian protection airbag deployment.

In some implementations, the processor is configured to determine, based on the acquired data, a front-view image or an around-view image of the vehicle; and detect, based on the front-view image or the around-view image of the vehicle, that the vehicle has collided with the object.

In some implementations, the processor is configured to determine, based on the acquired data, that the object is a person or a two-wheeled vehicle with a passenger riding thereon; determine, based on the acquired data, that the collision is a front collision; and provide, based on the determination that the object is a person or a two-wheeled vehicle with a passenger riding thereon and that the collision is a front collision, a control signal to perform hood lift-up or pedestrian protection airbag deployment.

In some implementations, the processor is configured to determine, based on the acquired data, that the object is an animal; determine, based on the acquired data, that the collision is a front collision; and provide, based on the determination that the object is an animal and that the collision is a front collision, a control signal that disables hood lift-up or pedestrian protection airbag deployment.

In some implementations, the processor is configured to determine, based on the acquired data, that the object is an inanimate object; determine, based on the acquired data, that the collision is a front collision; and provide, based on the determination that the object is an inanimate object and that the collision is a front collision, control signals to disable hood lift-up or the pedestrian protection airbag deployment.

In some implementations, the processor is configured to determine, based on the acquired data, that the collision is one of a front collision, a rear collision, a side collision, or a front offset collision.

In some implementations, the processor is configured to determine, based on the acquired data, a front-view image or an around-view image of the vehicle; detect, based on the front-view image or the around-view image of the vehicle, that the vehicle has had a rollover accident; and provide, based on the detection that the vehicle has had a rollover accident, a control signal to disable hood lift-up or pedestrian protection airbag deployment.

In some implementations, the processor is configured to provide, based on the detection that the object has collided with the vehicle, a control signal for performing indoor airbag deployment.

In some implementations, the processor is configured to determine, based on the acquired data, a front-view image or an around-view image of the vehicle; and detect that the vehicle has collided with the object based on the front-view image or the around-view image of the vehicle.

In some implementations, the processor is configured to determine, based on the acquired data, that the object is a person or a two-wheeled vehicle with a passenger riding thereon; determine, based on the acquired data, that the collision is a front collision; and provide, based on the determination that the object is a person or a two-wheeled vehicle with a passenger riding thereon and that the collision is a front collision, a control signal for preventing deployment of an indoor airbag.

In some implementations, the driver assistance apparatus further includes an interface configured to receive information regarding a speed of the vehicle. The processor is configured to determine, based on the information regarding on a vehicle speed of the vehicle, that the speed of the vehicle exceeds a reference value; and provide, based on the determination that the speed of the vehicle exceeds the reference value, a control signal for performing indoor airbag deployment.

In some implementations, performing the indoor airbag deployment includes performing a front impact airbag deployment and a side impact airbag deployment.

In some implementations, the processor configured to determine, based on the acquired data, that the object is an animal; determine, based on the acquired data, that the collision is a front collision; detect a size of the animal; and provide, based on the determination that the object is an animal and that the collision is a front collision, a control signal for performing indoor airbag deployment according to the detected size of the animal.

In some implementations, the processor is configured to determine, based on the acquired data, that the object is an inanimate object; determine, based on the acquired data, that the collision is a front collision or a rear collision; and provide, based on the determination that the object is an inanimate object and that the collision is a front collision or a rear collision, a control signal for performing front impact airbag deployment and a control signal for disabling side impact airbag deployment.

In some implementations, the driver assistance apparatus further includes an internal object detection sensor configured to sense a position of a head of a passenger of the vehicle. The processor is configured to determine, based on the sensed position of the head of the passenger of the vehicle, that the position of the head of the passenger has moved to the right or to the left relative to a direction of travel of the vehicle; and provide, based on the determination that the position of the head of the passenger has moved to the right or to the left relative to the direction of travel of the vehicle, a control signal for performing side impact airbag deployment.

In some implementations, the processor is configured to determine, based on the acquired data, that the object is an inanimate object; determine, based on the acquired data, that the collision is a side collision; and provide, based on the determination that the object is an inanimate object and that the collision is a side collision, a control signal for disabling front impact airbag and a control signal for performing side impact airbag deployment.

In some implementations, the processor is configured to determine, based on the acquired data, that the object is an inanimate object; determine, based on the acquired data, that the collision is a front offset collision; and provide, based on the determination that the object is an inanimate object and that the collision is a front offset collision, a control signal for performing front impact airbag deployment and a control signal for performing side impact airbag deployment.

In some implementations, the processor is configured to determine, based on the acquired data, a front-view image or an around-view image of the vehicle; detect, based on the front-view image or the around-view image of the vehicle, that the vehicle has had a rollover accident; and provide, based on the detection that the vehicle has had a rollover accident, a control signal for disabling front impact airbag deployment and a control signal for performing side impact airbag deployment.

In some implementations, the driver assistance apparatus further includes an interior object detection sensor configured to acquire data regarding an interior of the vehicle. The processor is configured to detect, based on the acquired data regarding the interior of the vehicle, a passenger in the vehicle; determine, based on the acquired data regarding the interior of the vehicle, a state of the detected passenger; and provide, based on the determined state of the detected passenger, a control signal for performing or disabling indoor airbag deployment.

In some implementations, the processor is configured to determine that a passenger is not detected as sitting in any passenger seat of the vehicle or that the sitting height of a detected passenger in a passenger seat of the vehicle is less than a reference value; and provide, based on the determination that a passenger is not detected as sitting in any passenger seat of the vehicle or that the sitting height of a detected passenger in a passenger seat of the vehicle is less than a reference value, a control signal for preventing deployment of a passenger seat airbag included in the indoor airbag.

In another aspect, a vehicle includes a driver assistance apparatus that includes an object detection sensor configured to acquire data in a driving direction of the vehicle or around the vehicle. The driver assistance apparatus also includes a processor configured to detect, based on the acquired data, an object and determine, based on the acquired data, at least one attribute of the detected object. The processor is further configured to detect that the vehicle has collided with the object and determine, based on the detection that the object has collided with the vehicle and the at least one attribute of the object, whether to perform at least one of hood lift-up or pedestrian protection airbag deployment. The processor is further configured to provide a control signal for at least one of the hood lift-up or the pedestrian protection airbag deployment based on the determination of whether to perform the at least one of the hood lift-up or the pedestrian protection airbag deployment.

In some implementations, the vehicle further includes a collision sensor configured to provide information regarding a collision involving the vehicle. The vehicle further includes a controller configured to determine that the driver assistance apparatus provides a first control signal for disabling hood lift-up or a second control signal for disabling pedestrian protection airbag deployment; and based on the determination that the driver assistance apparatus provides the first control signal for disabling hood lift-up or the second control signal for disabling pedestrian protection airbag deployment, process the first control signal or the second control signal prior to receiving the information on collision from the collision sensor.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

Figure 1:
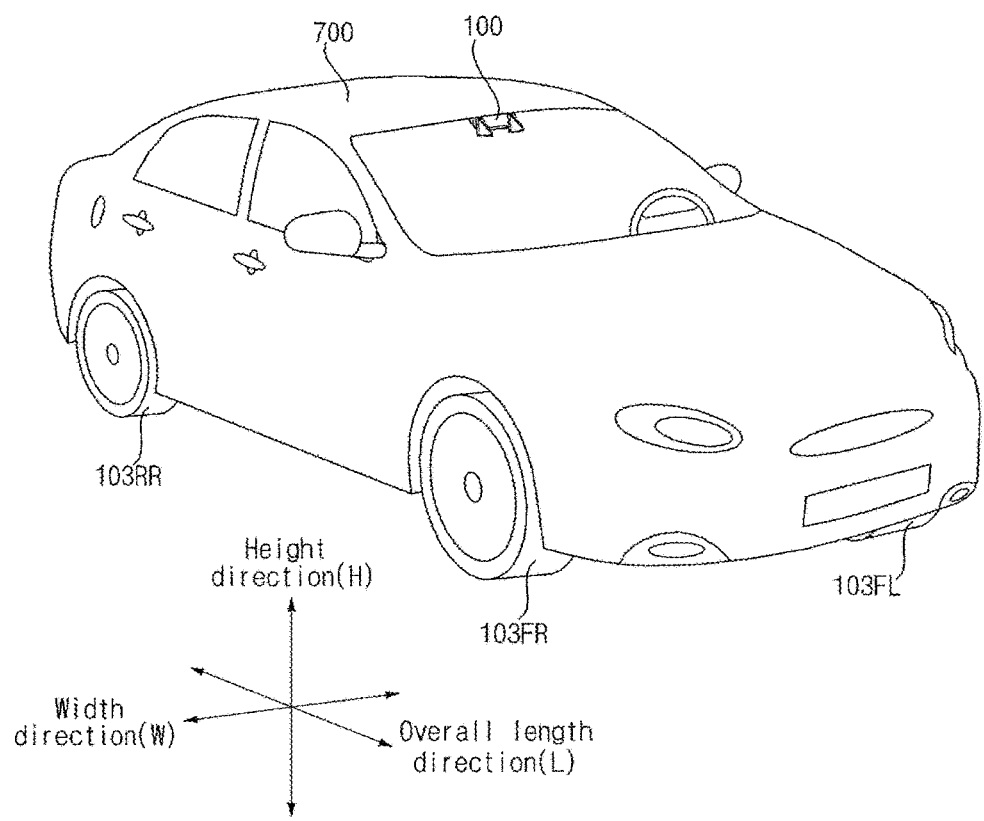
FIG. 1 is a diagram illustrating an example of an exterior of a vehicle including a display apparatus for a vehicle.

A vehicle may include a protection apparatus for protecting pedestrians. Typical examples of the protection apparatus include an active hood lift-up apparatus and a pedestrian airbag apparatus. The active hood lift-up apparatus lifts a hood upon sensing of collision with a pedestrian so as to prevent secondary collision and to mitigate impact applied to the pedestrian. The pedestrian airbag apparatus deploys an airbag to cover the windshield and A pillar upon sensing of collision of a pedestrian so as to mitigate impact applied to the pedestrian.

These protection apparatuses operate in such a manner that a collision sensor senses collision between the vehicle and a pedestrian. However, such protection apparatuses operate even when the vehicle collides with an animal or other objects. Systems and techniques disclosed herein enable adaptive deployment of safety features in a vehicle. Such safety features may include internal and/or external air bags, vehicle hood height adjustment, and other safety features designed to protect passengers of a vehicle and/or pedestrians around a vehicle. Although such safety features may be designed to automatically deploy under particular pre-specified conditions, deployment of the safety features may be expensive and, in some situations, unnecessary.

A driver assistance apparatus disclosed herein utilizes one or more sensors to acquire data in and around a vehicle and, based on the acquired data, determines whether to perform one or more safety operations, such as hood lift-up or pedestrian protection airbag deployment. In some implementations, if a safety feature is deployed, then the driver assistance apparatus may, based on the acquired data, adaptively control the safety feature to improve safety for a passenger or a pedestrian. As such, the driver assistance apparatus may not only enable a vehicle to more intelligently and efficiently utilize its safety features, but also improve the effectiveness of the safety features.

As examples, the driver assistance apparatus may control a delay and/or a timing of deployment of a hood lift-up operation or an air bag deployment operation based on data acquired in and around a vehicle. Controlling the timing/delay of an air bag deployment may enable adaptively controlling the volume of air in an air bag when a passenger or pedestrian makes contact with the air bag. Controlling the timing/delay of a hood lift-up operation may enable adaptively controlling the height of the vehicle's hood when a pedestrian makes contact with the hood. As such, the timing/delay of the air bag deployment and/or hood lift-up operation may be controlled so as to minimize injury to a passenger or pedestrian. As other examples, the driver assistance apparatus may control a speed of a hood lift-up operation, an angle of a hood lift-up operation, and/or a speed of air bag deployment.

The driver assistance apparatus provides a control signal for controlling a protection apparatus by accurately sensing collision between the vehicle and a pedestrian or a two-wheeled vehicle.

The driver assistance apparatus may thus enable control of a hood to be lifted and control of a pedestrian protection airbag to be deployed by correctly checking whether an object colliding with the vehicle is a pedestrian or a two-wheeled vehicle.

The driver assistance apparatus may also help reduce the number of occurrences of unnecessary hood lift-up operations when the vehicle collides with animals or objects other than a person.

The driver assistance apparatus may also help reduce the number of occurrences of unnecessary deployment of a pedestrian protection airbag when the vehicle collides with animals or objects other than a person, thereby reducing airbag replacement expenses.

The driver assistance apparatus may also help reduce airbag expenses by adaptively deploying indoor airbags according to collision type and changing only a deployed airbag.

A vehicle as described in this application may include a car or a motorcycle, but implementations are not necessarily limited thereto, and may generally include any suitable vehicle that transports people. Hereinafter the description will be based on a car.

The vehicle described in this application may include an internal combustion engine vehicle having an engine as a power source, a hybrid vehicle having an engine and an electric motor as a power source, an electric vehicle having an electric motor as a power source, or generally a vehicle that is motorized by any suitable power source.

In the following description, the left side of a vehicle refers to the left side in a driving direction of the vehicle and the right side of the vehicle refers to the right side in the driving direction of the vehicle.

A left-hand drive (LHD) vehicle refers to a vehicle in which a driver's seat is located at the left side of the vehicle. A right-hand drive (RHD) vehicle refers to a vehicle in which a driver's seat is located at the right side of the vehicle. LHD vehicles are used in countries where vehicles travel on a right side of two-way traffic, and RHD vehicles are used in countries where vehicles travel on a left side of two-way traffic.

The following description is based on left-hand drive (LHD) vehicles unless otherwise mentioned.

FIG. 1 shows the exterior of a vehicle including a display apparatus for a vehicle.

As shown, a vehicle 700 may include wheels 103FR, 103FL and 103RR rotating by a power source, a steering unit 721a for steering the vehicle 700 and a driver assistance apparatus 100 provided to the inside of the vehicle 700.

The driver assistance apparatus 100 may include at least one camera and an image acquired by the at least one camera may be processed into a signal in a processor.

FIG. 1 shows that the driver assistance apparatus 100 includes two cameras.

The overall length refers to the length between the front part and the rear part of the vehicle 700, the width refers to the width of the vehicle 700 and the height refers to the distance between the lower part of the wheel and the roof of the vehicle. In the following description, an overall length direction L may refer to a direction in which the overall length of the vehicle 700 is measured, a width direction W may refer to a direction in which the width of the vehicle 700 is measured, and a height direction H may refer to a direction in which the height of the vehicle 700 is measured.

Figure 2A:
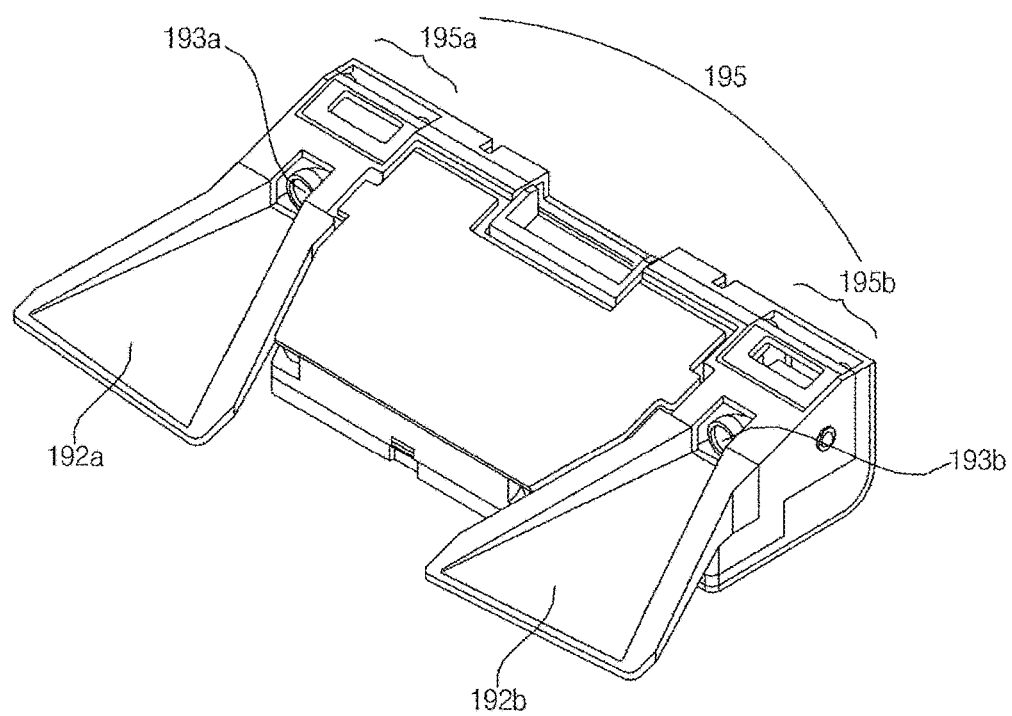
FIGS. 2A to 2C are diagrams illustrating examples of a driver assistance apparatus included in a vehicle.
Figure 2B:
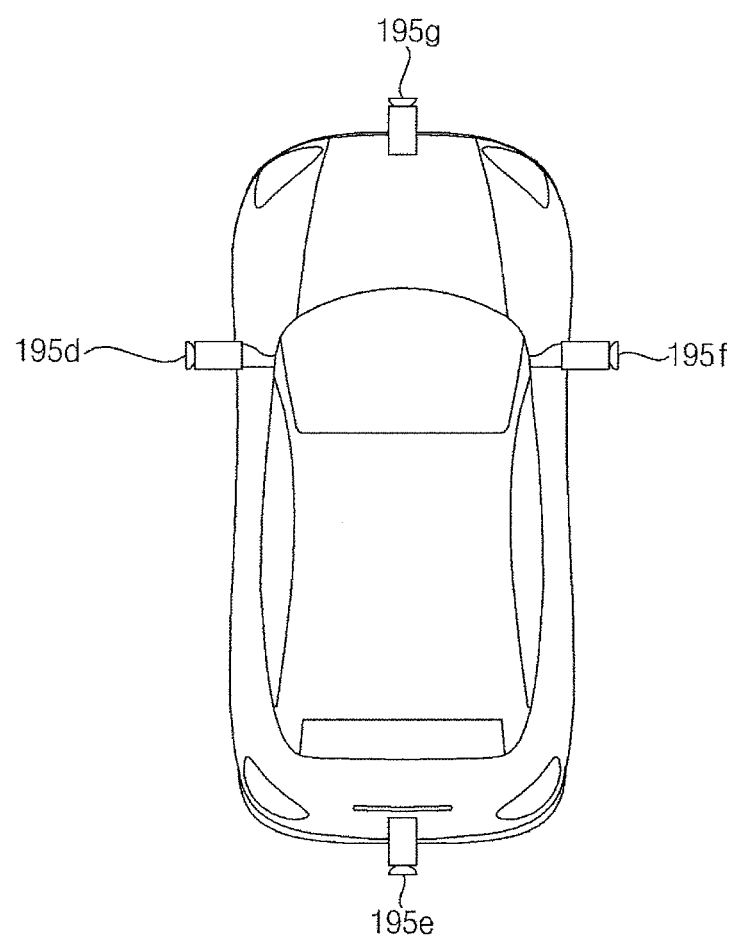
Figure 2C:
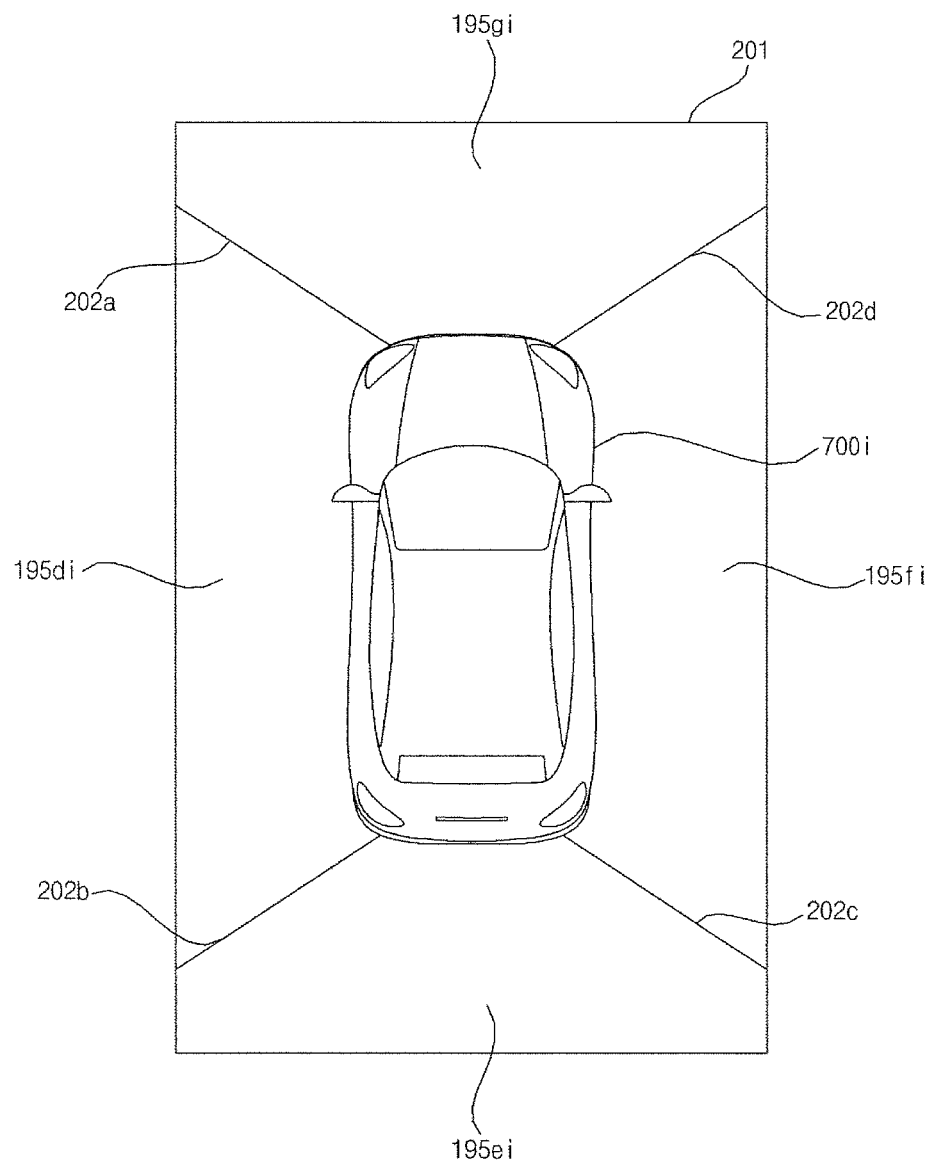

FIGS. 2A, 2B and 2C are views for explaining the driver assistance apparatus included in the vehicle shown in FIG. 1 according to an implementation.

A description will be given of a driving assistance device including cameras 195a and 195b for acquiring a front view image of the vehicle.

While FIG. 2A shows that the driver assistance apparatus 100 includes two cameras, the number of cameras is not limited thereto.

As shown, the driver assistance apparatus 100 may include a first camera 195a having a first lens 193a and a second camera 195b having a second lens 193b. In this case, the camera 195 may be called a stereo camera.

In addition, the driver assistance apparatus 100 may include a first light shield 192a and a second light shield 192b for respectively shielding light input to the first lens 193a and the second lens 193b.

The driver assistance apparatus 100 may have a structure that can be attached/detached to/from the ceiling or windshield of the vehicle 700.

The driver assistance apparatus 100 can acquire stereo images of the area in front of the vehicle from the first and second cameras 195a and 195b, perform disparity detection on the basis of the stereo images, detect an object with respect to at least one stereo image on the basis of disparity information and continuously track movement of the object after detection of the object.

A description will be given of a driving assistance device including cameras 195d, 195e, 195f and 195g for acquiring an around view image of the vehicle with reference to FIGS. 2B and 2C.

While FIGS. 2B and 2C show that the driver assistance apparatus 100 includes four cameras, the number of cameras is not limited thereto.

As shown, the driver assistance apparatus 100 may include a plurality of cameras 195d, 195e, 195f and 195g. In this case, the camera 195 may be called an around view camera.

The plurality of cameras 195d, 195e, 195f and 195g may be arranged at the left, back, right and front of the vehicle. The left camera 195d may be provided to the inside of a case of a left side-view mirror. Otherwise, the left camera 195d may be provided to the outside of the case of the left side-view mirror. Alternatively, the left camera 195d may be provided to the left front door, the left rear door or a region of the outside of the left fender.

The right camera 195f may be provided to the inside of a case of a right side-view mirror. Otherwise, the right camera 195f may be provided to the outside of the case of the right side-view mirror. Alternatively, the right camera 195f may be provided to the right front door, the right rear door or a region of the outside of the right fender.

The rear camera 195e may be provided to the rear license plate or near the trunk switch of the vehicle. The front camera 195g may be positioned near the emblem or the radiator grill of the vehicle.

Images photographed by the plurality of cameras 195d, 195e, 195f and 195g are transmitted to a processor 170. The processor 170 can generate an around view image of the vehicle by combining the respective images.

FIG. 2C shows an exemplary around view image of the vehicle. The around view image 201 of the vehicle may include a first image region 195di captured by the left camera 195d, a second image region 195ei captured by the rear camera 195e, a third image region 195fi captured by the right camera 195f and a fourth image region 195gi captured by the front camera 195g.

The around view image 201 may be displayed as a top view image or a bird's eye image.

When the around view image is generated from the plurality of cameras, a boundary between image regions is generated. The boundary may be smoothly displayed through image blending.

In addition, boundary lines 202a, 202b, 202c and 202d may be displayed on the boundaries of the plurality of images.

The around view image 201 of the vehicle may include a vehicle image 700i. The vehicle image 700i may be an image generated by the processor 170.

The around view image 201 of the vehicle may be displayed through a display 741 of the vehicle or a display 180 of the driver assistance apparatus.

Figure 3A:
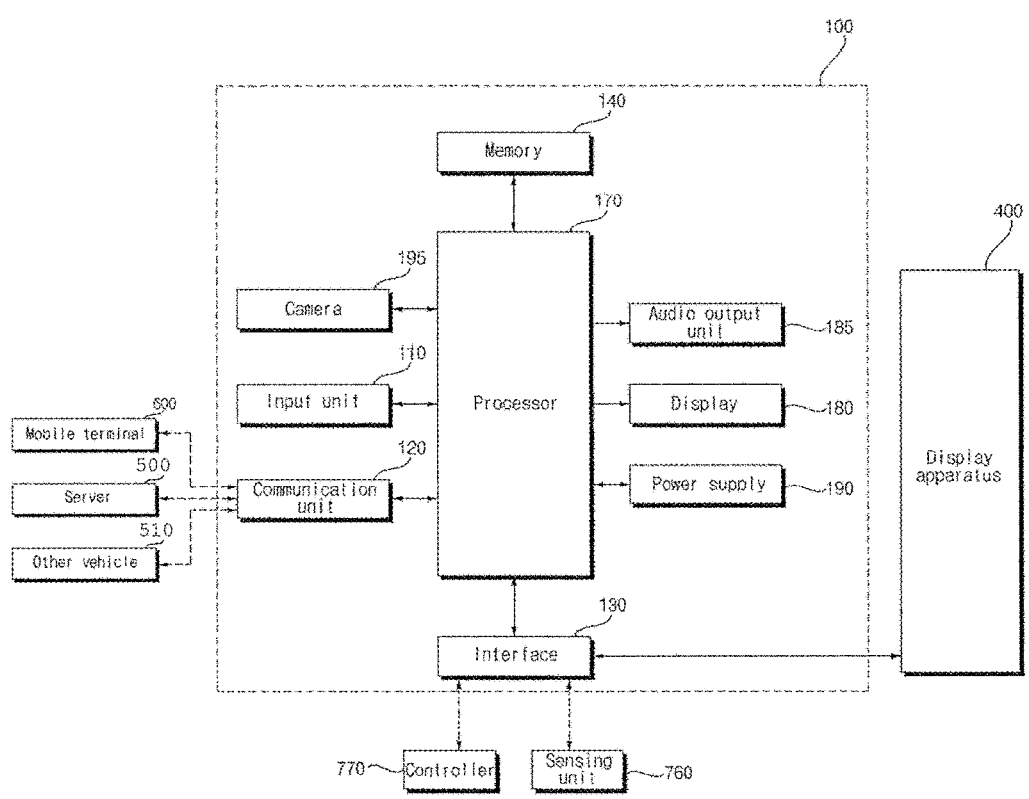
FIGS. 3A to 3C are block diagrams illustrating examples of a driver assistance apparatus.
Figure 3B:
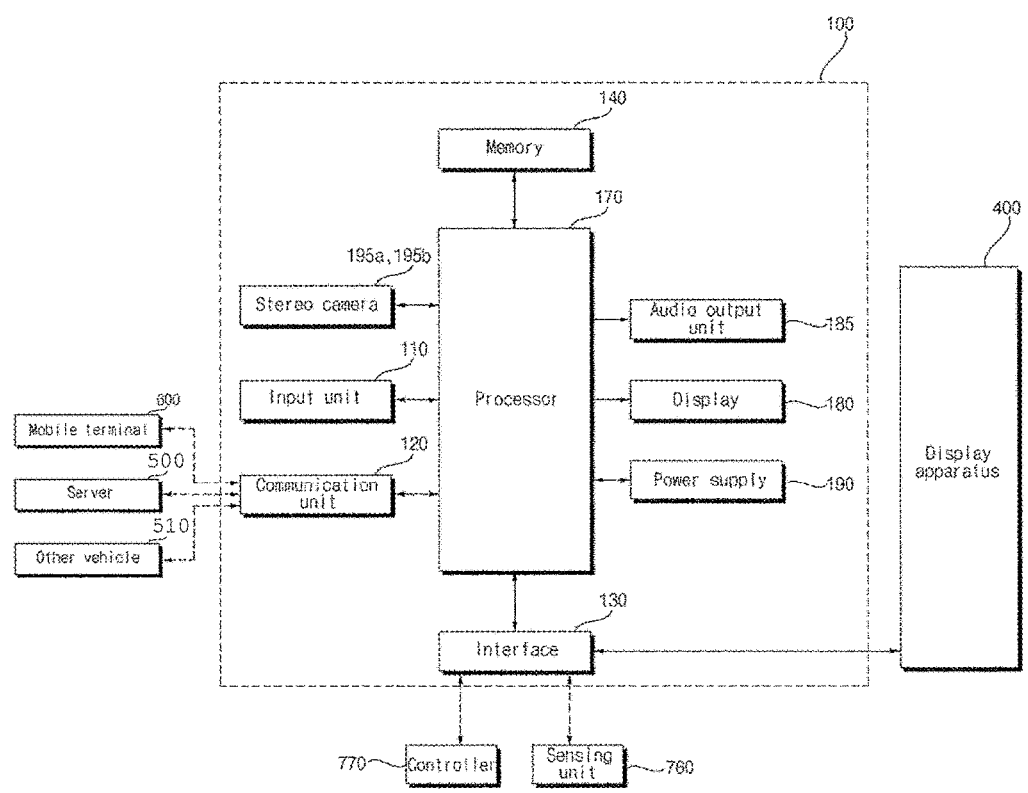
Figure 3C:
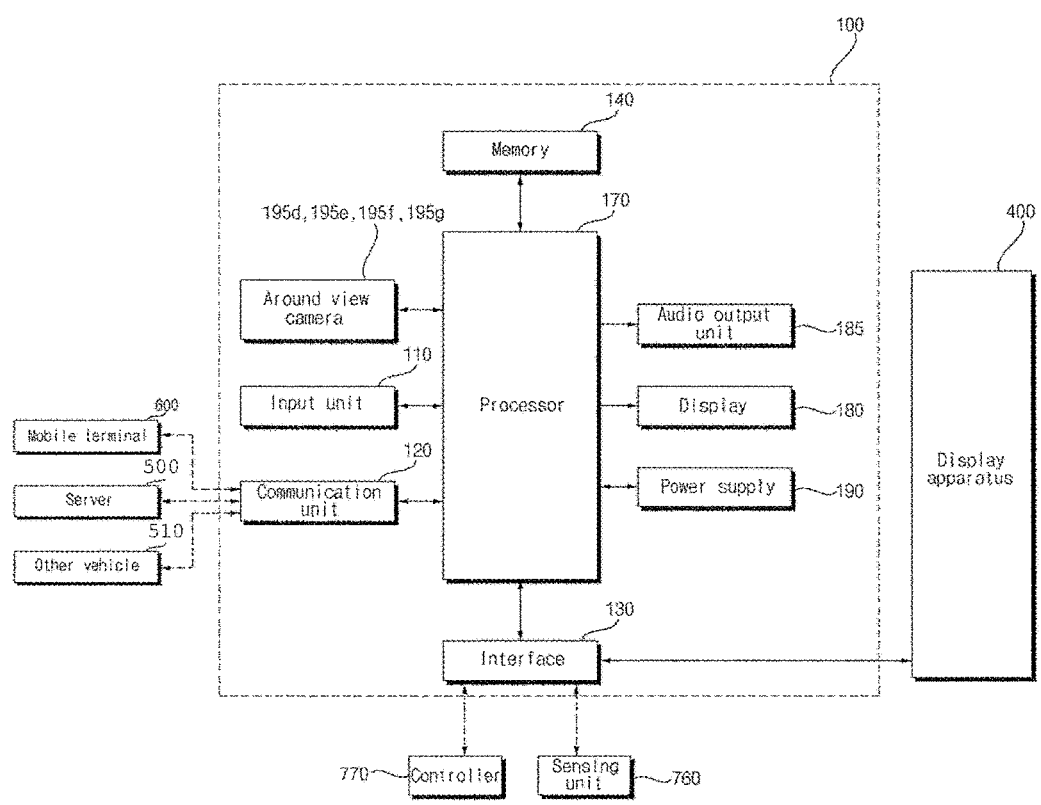

FIGS. 3A, 3B and 3C are block diagrams of the driver assistance apparatus according to various implementations.

The driver assistance apparatus 100 shown in FIGS. 3A and 3B may process an image received from the camera 195 on the basis of computer vision so as to generate vehicle related information. Here, the vehicle related information may include vehicle control information for direct control of the vehicle or vehicle driving assistance information for providing driving guidance to a vehicle driver.

Here, the camera 195 may be a mono camera. Otherwise, the camera 197 may be the stereo cameras 195a and 195b for photographing a front view image of the vehicle. Alternatively, the camera 195 may be around view cameras 195d, 195e, 195f and 195g for photographing an around view image of the vehicle.

FIG. 3A is a block diagram of the driver assistance apparatus 100 according to an implementation.

Referring to FIG. 3A, the driver assistance apparatus 100 may include an input unit 110, a communication unit 120, an interface 130, a memory 140, the processor 170, a power supply 190, the camera 195, the display 180 and an audio output unit 185.

The input unit 110 may include a plurality of buttons or a touchscreen attached to the driver assistance apparatus 100, particularly, the camera 195. It is possible to turn on and operate the driver assistance apparatus 100 through the plurality of buttons or the touchscreen. In addition, various input operations may be performed through the buttons or the touchscreen.

The communication unit 120 may exchange data with a mobile terminal 600, a server 500 or another vehicle 510 in a wireless manner. Particularly, the communication unit 120 may wirelessly exchange data with a mobile terminal of the vehicle driver. Various data communication schemes such as Bluetooth, Wi-Fi Direct, Wi-Fi, APiX and NFC may be employed as a wireless data communication scheme.

The communication unit 120 may receive weather information and traffic information, for example, TPEG (Transport Protocol Expert Group) information from the mobile terminal 600 or the server 500. The driver assistance apparatus 100 may transmit acquired real-time information to the mobile terminal 600 of the server 500.

When a user enters the vehicle, the mobile terminal 600 of the user and the driver assistance apparatus 100 may be paired automatically or according to execution of an application by the user.

The communication unit 120 may receive information on traffic light change from an external server 500. Here, the external server 500 may be a server located at a traffic control center.

The interface 130 may receive vehicle related data and transmit signals processed or generated in the processor 170 to the outside. To this end, the interface 130 may perform data communication with a controller 770 provided to the inside of the vehicle, a display apparatus 400 for the vehicle and a sensing unit 760 of the vehicle through a wired or wireless communication scheme.

The interface 130 may receive navigation information through data communication with the controller 770, the display apparatus 400 for the vehicle or a separate navigation system. The navigation information may include information on a set destination, route information depending on the destination, map information related to driving of the vehicle, and information on the current position of the vehicle. In addition, the navigation information may include information on the position of the vehicle on a road.

The interface 130 may receive sensor information from the controller 770 or the sensing unit 760. Here, the sensor information may include at least one of vehicle direction information, vehicle position information (GPS information), vehicle heading information, vehicle speed information, vehicle acceleration information, vehicle tilt information, information on forward/reverse movement of the vehicle, battery information, fuel information, tire information, vehicle lamp information, vehicle internal temperature information and vehicle internal humidity information.

Such sensor information may be acquired from a heading sensor, a yaw sensor, a gyro sensor, a position module, a vehicle front/rear sensor, a wheel sensor, a speed sensor, a car body tilting sensor, a battery sensor, a fuel sensor, a tire sensor, a steering sensor, a vehicle internal temperature sensor, a vehicle internal humidity sensor and the like. The position module may include a GPS module for receiving GPS information.

From among the sensor information, the vehicle direction information, vehicle position information, vehicle heading information, vehicle speed information and vehicle tilt information, which are related to driving of the vehicle, may be called vehicle driving information.

The memory 140 may store various types of data for overall operation of the driver assistance apparatus 100, such as a program for processing or control of the processor 170.

The memory 140 may store data for object identification. For example, when a predetermined object is detected from an image acquired through the camera 195, the memory can store data for identifying the object according to a predetermined algorithm.

The memory 140 may store data regarding traffic information. For example, when predetermined traffic information is detected from an image acquired through the camera 195, the memory 140 can store data for identifying the traffic information according to a predetermined algorithm.

The memory 140 may be a storage device such as a ROM, a RAM, an EPROM, a flash drive and a hard drive.

The processor 170 controls overall operation of each unit of the driver assistance apparatus 100.

The processor 170 may process a front view image or an around view image of the vehicle, acquired by the camera 195. Particularly, the processor 170 performs computer vision based signal processing. Accordingly, the processor 170 can acquire a front view image or an around view image of the vehicle from the camera 195 and perform object detection and object tracking on the basis of the acquired image. Particularly, the processor 170 can perform lane detection (LD), vehicle detection (VD), pedestrian detection (PD), bright spot detection (BD), traffic sign recognition (TSR), road surface detection and the like during object detection.

A traffic sign may refer to predetermined information that can be transmitted to the driver of the vehicle 700. The traffic sign can be transmitted to the driver through a traffic light, a road sign or a road surface. For example, the traffic sign can be a "go" or "stop" sign for vehicles or pedestrians, output from a traffic light. The traffic sign may be a symbol or text indicated on a road sign. For example, the traffic sign can be a symbol or text indicated on the surface of a road.

The processor 170 may detect information from the front view image or the around view image of the vehicle, acquired through the camera 195. The information may be information on vehicle driving situations. For example, the information can include information on a road on which the vehicle travels, traffic rules, information on neighboring vehicles, information on a traffic light for vehicles or pedestrians, information on construction, traffic condition information, parking information, lane information and the like.

The processor 170 may compare the detected information with information stored in the memory 140 to identify the information.

Furthermore, the processor 170 may receive weather information and traffic condition information on roads, for example, TPEG (Transport Protocol Expert Group) information through the communication unit 120.

The processor 170 may recognize information on traffic conditions around the vehicle, detected by the driver assistance apparatus 100 on the basis of an image.

The processor 170 may receive navigation information and the like from the display apparatus 400 for the vehicle or a separate navigation system through the interface 130.

The processor 170 may receive sensor information from the controller 770 or the sensing unit 760 through the interface 130. Here, the sensor information may include at least one of vehicle direction information, vehicle location information (GPS information), vehicle heading information, vehicle speed information, vehicle acceleration information, vehicle tilt information, vehicle advance/reverse movement information, battery information, fuel information, tire information, vehicle lamp information, vehicle internal temperature information, vehicle internal humidity information and steering wheel rotation information.

The processor 170 may receive navigation information from the controller 770, the display apparatus 400 for the vehicle or a separate navigation system through the interface 130.

The processor 170 may detect an object from the front view image or around view image of the vehicle. The processor 170 may provide a control signal for hood lift-up or pedestrian airbag deployment on the basis of whether the vehicle 700 has collided with the detected object. The control signal may be provided to a protection apparatus 800 through the controller 770.

The processor 170 may determine whether the vehicle 700 has collided with the detected object on the basis of the front view image or around view image of the vehicle. For example, the processor 170 can determine whether the vehicle has collided with the detected object on the basis of a mono image acquired by a mono camera. The processor 170 may calculate a distance between the vehicle 700 and the detected object on the basis of a change in the size of the object according to movement of the vehicle 700. When the distance between the vehicle 700 and the detected object is less than a reference value, the processor 170 may determine that the vehicle 700 has collided with the detected object.

For example, the processor 170 can determine whether the vehicle 700 has collided with the detected object on the basis of stereo images acquired by stereo cameras. The processor 170 may calculate the distance between the vehicle 700 and the detected object using disparity detected on the basis of the stereo images. When the distance between the vehicle 700 and the detected object is less than a reference value, the processor 170 may determine that the vehicle 700 has collided with the detected object.

For example, the processor 170 can determine whether the vehicle 700 has collided with the detected object on the basis of an around view image acquired by around view cameras. The processor 170 can determine whether the vehicle 700 has collided with the detected object in the same manner as the aforementioned determination based on a mono image.

The processor 170 may determine a direction in which the collision occurs on the basis of the front view image or around view image of the vehicle. For example, the processor 170 can determine forward collision or forward offset collision with the object on the basis of the front view image of the vehicle. Specifically, the processor 170 can determine the collision between the vehicle 700 and the object as forward collision when the object is detected from the front view image of the vehicle and collision occurs. The processor 170 can determine the collision between the vehicle 700 and the object as front offset collision when the object is detected from a front collision image and collision occurs only at a part of the vehicle (e.g., part of the bumper).

For example, the processor 170 can determine forward collision, rear collision, side collision or forward offset collision with the object on the basis of the around view image of the vehicle. Specifically, the processor 170 can determine the collision between the vehicle 700 and the object as forward collision when the object is detected from an image acquired by the front camera 195g and collision occurs. The processor 170 can determine the collision between the vehicle 700 and the object as front offset collision when the object is detected from the image acquired by the front camera 195g and collision occurs only at a part of the vehicle (e.g., part of the bumper). The processor 170 can determine the collision between the vehicle 700 and the object as rear collision when the object is detected from an image acquired by the rear camera 195e and collision occurs. The processor 170 can determine the collision between the vehicle 700 and the object as left side collision when the object is detected from an image acquired by the left camera 195d and collision occurs. The processor 170 can determine the collision between the vehicle 700 and the object as right side collision when the object is detected from an image acquired by the right camera 195f and collision occurs.

The processor 170 may determine whether a rollover accident occurs on the basis of the front view image or around view image of the vehicle. When rotation of the front view image or around view image of the vehicle in a predetermined direction is detected, the processor 170 may determine that a rollover accident occurs. For example, the processor 170 can determine occurrence of a rollover accident when rotation on an axis in the overall length direction L of the vehicle 700 is detected.

If the object is a person or a two-wheeled vehicle with a person riding thereon and collision between the vehicle 700 and the object is front collision, the processor 170 can provide a control signal for performing a hood lift-up operation or a pedestrian protection airbag deployment operation.

If the object is an inanimate object, the processor 170 can provide a control signal for disabling a hood lift-up operation or disabling a pedestrian protection airbag deployment operation. Here, the inanimate object may include other vehicles, a guardrail, a street tree, a streetlamp, a telephone pole and the like. Here, collision may be front collision, rear collision, side collision or front offset collision.

When the rollover accident is detected, the processor 170 can provide a control signal for hood lift-up off or pedestrian protection airbag deployment off. Here, the rollover accident may be determined on the basis of the front view image or around view image of the vehicle. Furthermore, the rollover accident may be determined on the basis of a signal sensed by a vehicle posture sensor (e.g., a heading sensor, a yaw sensor, a gyro sensor and a position module) included in the sensing unit 760.

The processor 170 may further provide a control signal for indoor airbag deployment on or off on the basis of whether the vehicle 700 has collided with the detected object. The processor 170 may determine whether the vehicle 700 has collided with the detected object on the basis of the front view image or around view image of the vehicle, as described above.

The processor 170 may determine a direction in which the collision occurs on the basis of the front view image or around view image of the vehicle, as described above.

If the object is a person or a two-wheeled vehicle with a person riding thereon and collision between the vehicle 700 and the object is front collision, the processor 170 can provide a control signal for indoor airbag deployment off. Here, when the vehicle speed is lower than a reference value, the processor 170 can provide the control signal for indoor airbag deployment off.

When the vehicle speed exceeds the reference value, the processor 170 can provide a control signal for indoor airbag deployment on. The processor 170 may receive information on the vehicle speed from the sensing unit 760 or the controller 770 through the interface 130. Even if the vehicle collides with a pedestrian or a two-wheeled vehicle, the vehicle may deploy the indoor airbag since large impact may be applied to a passenger when the vehicle 700 is running at a high speed.

The indoor airbag may include a front impact prevention airbag and a side impact prevention airbag. The front impact prevention airbag may include a driver seat airbag, a passenger seat airbag and a knee protection airbag. The side impact prevention airbag may include a curtain airbag and a side airbag.

If the object is an animal and collision between the vehicle 700 and the object is front collision, the processor 170 can detect the size of the animal and provide a control signal for indoor airbag deployment on or off on the basis of the detected size.

When the detected animal size is less than a reference size, the processor 170 may provide a control signal for indoor airbag deployment off. When the detected animal size is greater than the reference size, the processor 170 may provide a control signal for indoor airbag deployment on.

The weight of an animal is proportion to the size thereof. In addition, impact is proportion to weight. Impact generated when the vehicle collides with a large animal is greater than impact generated when the vehicle collides with a small animal. Accordingly, the processor 170 can provide an indoor airbag deployment on or off control signal in consideration of impact applied to the user depending on the size of the animal colliding with the vehicle.

If the object is an inanimate object and collision between the vehicle 700 and the object is front collision or rear collision, the processor 170 may provide a control signal for front impact prevention airbag on. In this case, the processor 170 may provide a control signal for side impact prevention airbag off.

When the position of the head of the passenger is moved to the right or left of the vehicle running direction, the processor 170 may provide a control signal for side impact prevent airbag on. Here, the position of the head of the passenger may be sensed by the internal camera 195*c*. In this case, the processor 170 may provide a control signal for curtain airbag on and a control signal for a side airbag off according to an implementation.

If the object is an inanimate object and collision between the vehicle 700 and the object is side collision, the processor 170 may provide a control signal for front impact prevention airbag off. In this case, the processor 170 may provide a control signal for side impact prevention airbag on. Here, the inanimate object may be another vehicle, a guardrail, a street tree, a streetlamp, a telephone pole or the like.

If the object is an inanimate object and the collision between the vehicle 700 and the object is front offset collision, the processor 170 may provide a control signal for front impact prevention airbag on. In this case, the processor 170 may provide the control signal for side impact prevention airbag on. Here, the inanimate object may be another vehicle, a guardrail, a street tree, a streetlamp, a telephone pole or the like.

If a rollover accident is detected, the processor 170 may provide a control signal for front impact prevention airbag off. In this case, the processor 170 may provide the control signal for side impact prevention airbag on. Here, the rollover accident may be determined on the basis of the front view image or around view image of the vehicle. Alternatively, the rollover accident may be determined on the basis of a signal sensed by the vehicle posture sensor (e.g., a heading sensor, a yaw sensor, a gyro sensor and a position module) included in the sensing unit 760.

In addition, the processor 170 may detect a passenger from an image of the inside of the vehicle, acquired through the internal camera 195*c*. The processor 170 may provide a control signal for indoor airbag on or off on the basis of the state of the detected passenger.

For example, the processor 170 can provide a control signal for passenger seat airbag off when a passenger on the passenger seat is not detected or the sitting height of the detected passenger is less than a reference value.

The processor 170 may be implemented using at least one of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and other electrical units for executing the corresponding functions.

The processor 170 may be controlled by the controller 770.

The display 180 may display information processed by the processor 170. The display 180 may display images related to operation of the driver assistance apparatus 100. For such image display, the display 180 may include a cluster or an HUD (Head Up Display) provided to the front part of the inside of the vehicle. When the display 180 is an HUD, a projection module for projecting images may be provided to the windshield glass of the vehicle 700.

The audio output unit 185 may output sound on the basis of an audio signal processed by the processor 170. To this end, the audio output unit 185 may include at least one speaker.

An audio input unit may receive user voice. To this end, the audio input unit may include a microphone. The received voice may be converted into an electrical signal and transmitted to the processor 170.

The power supply 190 may supply power necessary for operations of the components under control of the processor 170. The power supply 190 may be provided with power from a battery of the vehicle.

The camera 195 acquires a front view image or an around view image of the vehicle. The camera 195 may be a mono camera or stereo cameras 195*a* and 195*b* for photographing a front view image of the vehicle. The camera 195 may be around view cameras 195*d*, 195*e*, 195*f* and 195*g* for photographing an around view image of the vehicle.

The camera 195 may include the internal camera 195*c*. The internal camera 195*c* can photograph the inside of the vehicle 700. The internal camera 195*c* is preferably disposed in a cockpit module.

The internal camera 195*c* may acquire an image of a passenger. The internal camera 195*c* may detect the number of passengers by acquiring an image of the passengers in the vehicle 700.

The camera 195 may include an image sensor (e.g., CMOS or CCD) and an image processing module. The camera 195 may process a still image or video acquired by the image sensor. The image processing module may process the still image or video acquired through the image sensor. The image processing module may be configured separately from the processor 170 or integrated with the processor 170 according to some implementations.

FIG. 3B is a block diagram of the driver assistance apparatus 100 according to another implementation.

Referring to FIG. 3B, the driver assistance apparatus 100 differs from the driver assistance apparatus 100 of FIG. 3A in that the former includes the stereo cameras 195*a* and 195*b*. The following description is based on such difference.

The driver assistance apparatus 100 may include the first and second cameras 195*a* and 195*b*. Here, the first and second cameras 195*a* and 195*b* can be called stereo cameras.

The stereo cameras 195*a* and 195*b* may be attached/detached to/from the ceiling or windshield of the vehicle 700. The stereo cameras 195*a* and 195*b* may include a first lens 193*a* and a second lens 193*b*.

In addition, the stereo cameras 195*a* and 195*b* may include a first light shield 192*a* and a second light shield 192*b* for respectively shielding light input to the first lens 193*a* and the second lens 193*b*.

The first camera 195*a* acquires a first front view image of the vehicle and the second camera 195*b* acquires a second front view image of the vehicle. The second camera 195*b* is spaced apart from the first camera 195*a* by a predetermined distance. Since the first and second cameras 195*a* and 195*b* are spaced apart from each other, a disparity is generated and thus distances between the first and second cameras 195*a* and 195*b* and an object according to the disparity can be detected.

When the driver assistance apparatus 100 includes the stereo cameras 195*a* and 195*b*, the processor 170 performs computer vision based signal processing. Accordingly, the processor 170 can acquire stereo images of the front view of the vehicle from the stereo cameras 195*a* and 195*b*, calculate a disparity with respect to the front view of the vehicle on the basis of the stereo images, perform object detection for at least one of the stereo images on the basis of the calculated disparity, detect an object and continuously track movement of the detected object. Here, the stereo images are based on the first image received from the first camera 195*a* and the second image received from the second camera 195*b*.

Particularly, the processor 170 may perform lane detection (LD), vehicle detection (VD), pedestrian detection (PD), bright spot detection (BD), traffic sign recognition (TSR), road surface detection and the like during object detection.

In addition, the processor 170 may perform calculation of a distance to a detected neighboring vehicle, calculation of the speed of the detected vehicle, calculation of a speed difference between the corresponding vehicle 700 and the detected vehicle and the like.

The processor 170 may individually control zoom of the first and second cameras 195a and 195b. The processor 170 may periodically change the zoom ratio of the second camera 195b while fixing the zoom of the first camera 195a. The processor 170 may periodically change the zoom ratio of the first camera 195a while fixing the zoom of the second camera 195b.

The processor 170 may control the first or second camera 195a or 195b to periodically zoom in or zoom out.

The processor 170 may set the zoom of the first camera 195a to high magnification for object detection at a long distance. In addition, the processor 170 may set the zoom of the second camera 195b to low magnification for object detection at a short distance. Here, the processor 170 may control the first camera 195a to zoom in and control the second camera 195b to zoom out.

Conversely, the processor 170 may set the zoom of the first camera 195a to low magnification for object detection at a short distance. In addition, the processor 170 may set the zoom of the second camera 195b to high magnification for object detection at a long distance. Here, the processor 170 may control the first camera 195a to zoom out and control the second camera 195b to zoom in.

For example, the processor 170 can control the zoom of the first camera 195a or the second camera 195b depending on an object detection result. When a road sign is detected but the sign thereon is not detected, the processor 170 can control the first camera 195a or the second camera 195b to zoom in.

The processor 170 may automatically control focus in response to zoom control of the camera 195.

FIG. 3C is a block diagram of the driver assistance apparatus 100 according to another implementation.

Referring to FIG. 3C, the driver assistance apparatus 100 differs from the vehicle driving assistance apparatus 100 of FIG. 3A in that the former includes around view cameras 195d, 195e, 195f and 195g. The following description is based on such difference.

The driver assistance apparatus 100 may include the around view cameras 195d, 195e, 195f and 195g. The around view cameras 195d, 195e, 195f and 195g may respectively include lenses and light shields for shielding light input to the lenses. The around view cameras 195d, 195e, 195f and 195g may include a left camera 195d, a rear camera 195e, a right camera 195f and a front camera 195g. The left camera 195d acquires a left-side view image of the vehicle and the rear camera 195e acquires a rear view image of the vehicle. The right camera 195f acquires a right-side view image of the vehicle and the front camera 195g acquires a front view image of the vehicle.

The images acquired through the around view cameras 195d, 195e, 195f and 195g are transmitted to the processor 170. The processor 170 may generate an around view image of the vehicle by combining the left-side view image, rear view image, right-side view image and front view image of the vehicle. Here, the around view image of the vehicle may be a top view image or a bird's eye view image. The processor 170 may generate the around view image by respectively receiving the left-side view image, rear view image, right-side view image and front view image of the vehicle, combining the received images and converting the combined images into a top view image.

The processor 170 may detect an object on the basis of the around view image of the vehicle. Particularly, the processor 170 may perform lane detection (LD), vehicle detection (VD), pedestrian detection (PD), bright spot detection (BD), traffic sign recognition (TSR), road surface detection and the like during object detection.

Furthermore, the processor 170 may individually control zoom of the around view cameras 195d, 195e, 195f and 195g. Zoom control of the processor 170 may be performed in the same manner as that with respect to the stereo cameras, described with reference to FIG. 3B.

Figure 4A:
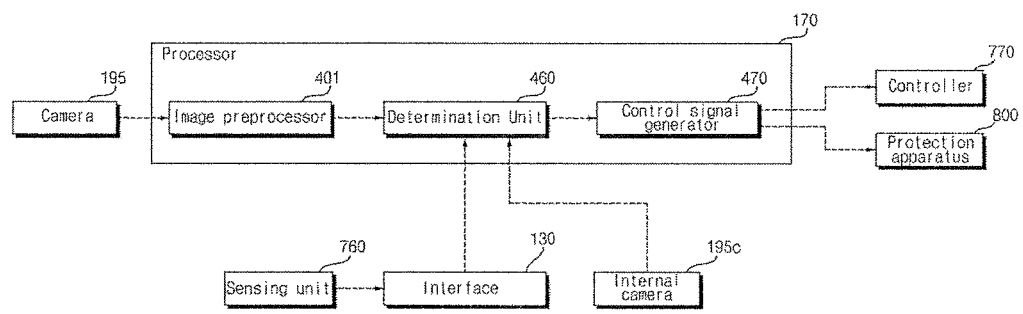
FIGS. 4A to 4C are block diagrams of examples of processors for a driver assistance apparatus.
Figure 4B:
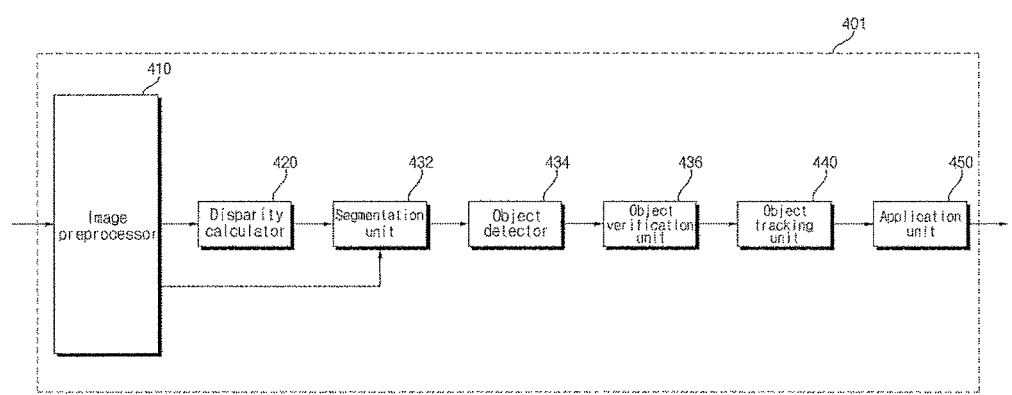
Figure 4C:
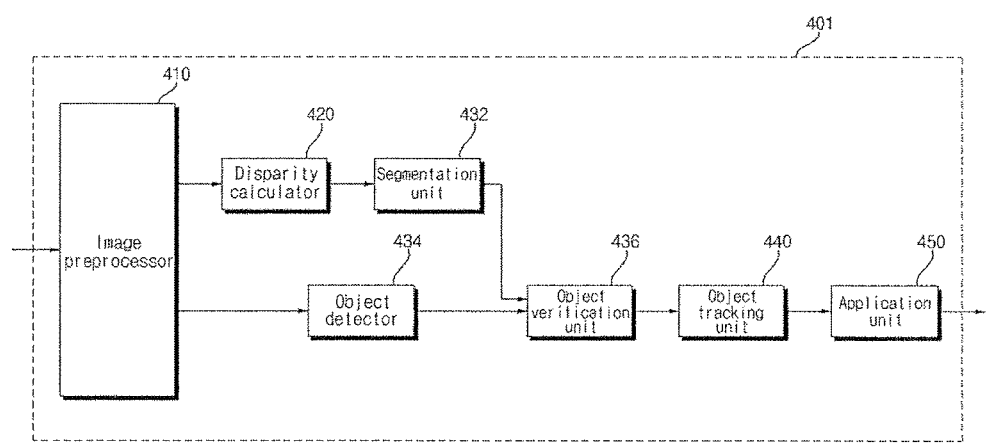

FIGS. 4A, 4B, and 4C are block diagrams of the processor shown in FIGS. 3A, 3B and 3C and FIGS. 5A and 5B are views for explaining operation of the processor shown in FIGS. 4A, 4B, and 4C.

Referring to FIG. 4A, the processor 170 may include an image processor 401, a determination unit 460 and a control signal generator 470.

The image processor 401 may receive an image from the camera 195. Here, the image may be the front view image or around view image of the vehicle. The image may be an image acquired using a mono camera, an image acquired using stereo cameras or an image acquired using around view cameras.

The image processor 401 may detect an object by processing the received image. Here, the object may be a person, a two-wheeled vehicle with a passenger riding thereon, an animal or an inanimate object.

The image processor 401 may identify the detected object by comparing the detected object with data stored in the memory 140. The image processor 401 may track the identified object. Object detection by the image processor 401 will be described in detail later with reference to FIGS. 4B and 4C.

The determination unit 460 may determine whether collision with the detected object has occurred. The determination unit 460 may determine whether collision with the detected object has occurred on the basis of information or data processed by the image processor 401.

For example, the determination unit 460 can determine whether collision with the detected object has occurred on the basis of a mono image acquired through a mono camera. The determination unit 460 may calculate a distance between the vehicle 700 and the detected object on the basis of a change in the size of the object according to movement of the vehicle 700. When the distance between the vehicle 700 and the detected object is less than a reference value, the determination unit 460 may determine that the vehicle 700 has collided with the detected object.

For example, the determination unit 460 can determine whether the vehicle 700 has collided with the detected object on the basis of stereo images acquired by stereo cameras. The determination unit 460 may calculate the distance between the vehicle 700 and the detected object using disparity detected on the basis of the stereo images. When the distance between the vehicle 700 and the detected object is less than a reference value, the determination unit 460 may determine that the vehicle 700 has collided with the detected object.

For example, the determination unit 460 can determine whether the vehicle 700 has collided with the detected object on the basis of an around view image acquired by around view cameras. The determination unit 460 can determine whether the vehicle 700 has collided with the detected object in the same manner as the aforementioned determination based on a mono image.

The determination unit 460 may determine the direction of collision. The determination unit 460 may determine a direction in which the collision occurs on the basis of information or data processed by the image processor 401.

For example, the determination unit 460 can determine forward collision or forward offset collision with the object on the basis of the front view image of the vehicle. Specifically, the determination unit 460 can determine the collision between the vehicle 700 and the object as forward collision when the object is detected from the front view image of the vehicle and collision occurs. The determination unit 460 can determine the collision between the vehicle 700 and the object as front offset collision when the object is detected from a front collision image and collision occurs only at a part of the vehicle (e.g., part of the bumper).

For example, the determination unit 460 can determine forward collision, rear collision, side collision or forward offset collision with the object on the basis of the around view image of the vehicle. Specifically, the determination unit 460 can determine the collision between the vehicle 700 and the object as forward collision when the object is detected from an image acquired by the front camera 195*g* and collision occurs. The determination unit 460 can determine the collision between the vehicle 700 and the object as front offset collision when the object is detected from the image acquired by the front camera 195*g* and collision occurs only at a part of the vehicle (e.g., part of the bumper). The determination unit 460 can determine the collision between the vehicle 700 and the object as rear collision when the object is detected from an image acquired by the rear camera 195*e* and collision occurs. The determination unit 460 can determine the collision between the vehicle 700 and the object as left side collision when the object is detected from an image acquired by the left camera 195*d* and collision occurs. The determination unit 460 can determine the collision between the vehicle 700 and the object as right side collision when the object is detected from an image acquired by the right camera 195*f* and collision occurs.

The determination unit 460 may determine whether a rollover accident occurs on the basis of the front view image or around view image of the vehicle. When rotation of the front view image or around view image of the vehicle in a predetermined direction is detected, the determination unit 460 may determine that a rollover accident occurs. For example, the determination unit 460 can determine occurrence of a rollover accident when rotation on an axis in the overall length direction L of the vehicle 700 is detected from an image of sensed rotation.

When the object is a person or a two-wheeled vehicle with a person riding thereon and collision between the vehicle 700 and the object is front collision, the determination unit 460 may determine whether to deploy the indoor airbag depending on the vehicle speed. Specifically, when the vehicle speed exceeds a reference value, the determination unit 460 may determine that the indoor airbag needs to be deployed even if the object is a person or a two-wheeled vehicle with a passenger riding thereon and the collision between the vehicle 700 and the object is front collision.

When the object is animal and collision between the vehicle 700 and the object is front collision, the determination unit 460 may determine whether to deploy the indoor airbag depending on the size of the detected animal. Specifically, when the size of the detected animal is greater than a reference size, the determination unit 460 may determine that the indoor airbag needs to be deployed even if the object is animal and the collision between the vehicle 700 and the object is front collision.

When the object is an inanimate object and collision between the vehicle 700 and the object is front collision or rear collision, the determination unit 460 may determine that the side impact prevention airbag needs to be deployed on the basis of the position of the head of the passenger. Specifically, when the position of the head of the passenger is moved to the right or left of the vehicle driving direction, the determination unit 460 may determine that the side impact prevention airbag needs to be deployed. The position of the head of the passenger may be detected through the internal camera 195*c* included in the driver assistance apparatus 100.

In addition, the determination unit 460 may determine whether to deploy the indoor airbag on the basis of passengers detected from an image of the inside of the vehicle, acquired through the internal camera 195*c*.

The control signal generator 470 may generate a control signal for controlling the protection apparatus 800 on the basis of determination by the determination unit 460. Specifically, the control signal generator 470 may generate control signals for hood lift-up on or off, pedestrian protection airbag on or off, and indoor airbag on or off on the basis of determination by the determination unit 460.

When the determination unit 460 determines that the object is a person or a two-wheeled vehicle with a person riding thereon and collision between the vehicle 700 and the object is front collision, the control signal generator 470 may generate a control signal for hood lift-up on or pedestrian protection airbag deployment on.

When the determination unit 460 determines that the object is animal and collision between the vehicle 700 and the object is front collision, the control signal generator 470 may generate a control signal for hood lift-up on or pedestrian protection airbag deployment off.

When the determination unit 460 determines that the object is an inanimate object, the control signal generator 470 may generate a control signal for hood lift-up off and pedestrian protection airbag deployment off. Here, the inanimate object may include other vehicles, a guardrail, a street tree, a streetlamp, a telephone pole and the like. Here, collision may be front collision, rear collision, side collision or front offset collision.

When the determination unit 460 determines that a rollover accident has occurred, the control signal generator 470 may generate a control signal for hood lift-up off or pedestrian protection airbag deployment off.

The control signal generator 470 may further generate a control signal for indoor airbag on or off on the basis of whether the vehicle has collided with the detected object.

When the determination unit 460 determines that the object is a person or a two-wheeled vehicle with a passenger riding thereon and collision between the vehicle 700 and the object is front collision, the control signal generator 470 can generate a control signal for indoor airbag deployment off. Here, when the vehicle speed is greater than a reference value, the control signal generator 470 can generate a control signal for indoor airbag deployment on.

When the determination unit 460 determines that the object is animal and the collision between the vehicle 700 and the object is front collision, the control signal generator 470 can detect the size of the animal and generate a control signal for indoor airbag deployment on or off on the basis of the detected size.

When the determination unit 460 determines that the object is an inanimate object and the collision between the vehicle 700 and the object is front collision or rear collision, the control signal generator 470 may generate a control signal for front impact prevention airbag on. In this case, the control signal generator 470 may generate a control signal for side impact prevention airbag off. In this case, when the position of the head of the passenger is moved to the right or left of the vehicle running direction, the control signal generator 470 may generate a control signal for side impact prevent airbag on.

When the determination unit 460 determines that the object is an inanimate object and the collision between the vehicle 700 and the object is side collision, the control signal generator 470 may generate a control signal for front impact prevention airbag off. In this case, the control signal generator 470 may generate a control signal for side impact prevention airbag on.

When the determination unit 460 determines that the object is an inanimate object and the collision between the vehicle 700 and the object is front offset collision, the control signal generator 470 may generate a control signal for front impact prevention airbag on. In this case, the control signal generator 470 may generate a control signal for side impact prevention airbag on.

When the determination unit 460 determines that a rollover accident is detected, the control signal generator 470 may generate a control signal for front impact prevention airbag off. In this case, the control signal generator 470 may generate a control signal for side impact prevention airbag on.

The control signal generator 470 may generate a control signal for indoor airbag deployment on or off on the basis of the state of a detected passenger.

When the determination unit 460 determines that a passenger on the passenger seat is not detected or the sitting height of the detected passenger is less than a reference value, the control signal generator 470 may generate a control signal for passenger seat airbag off.

A control signal generated by the control signal generator 470 may be provided to the protection apparatus 800. Here, the control signal may be transmitted to the protection apparatus 800 directly or via the controller 770.

Referring to FIG. 4B, the image processor 401 may include an image preprocessor 410, a disparity calculator 420, an object detector 434, an object tracking unit 440, and an application unit 450.

The image preprocessor 410 may receive an image from the camera 195 and preprocess the image. Specifically, the image preprocessor 410 may perform noise reduction, rectification, calibration, color enhancement, color space conversion (CSC), interpolation, camera gain control and the like on an image. Accordingly, a clearer image than stereo images photographed by the camera 195 can be acquired.

The disparity calculator 420 may receive the image processed by the image preprocessor 410, perform stereo matching on the received image and acquire a disparity map according to stereo matching. For example, the disparity calculator 420 can acquire disparity information about stereo images of the front view of the vehicle.

Here, stereo matching can be performed per pixel of the stereo images or on a block by block basis. The disparity map refers to a map that represents binocular parallax information of stereo images, that is, left and right images, as numerical values.

A segmentation unit 432 may perform segmentation and clustering on at least one image on the basis of the disparity information from the disparity calculator 420. Specifically, the segmentation unit 432 may separate a background and a foreground from at least one of the stereo images on the basis of the disparity information.

For example, the segmentation unit 432 can calculate a region corresponding to disparity information less than a predetermined value in the disparity map as a background and remove the corresponding region. Accordingly, a foreground can be relatively separated.

Alternatively, the segmentation unit 432 can calculate a region corresponding to disparity information that exceeds the predetermined value in the disparity map as a foreground and extract the corresponding region, thereby separating the foreground.

When the foreground and the background are separated on the basis of the disparity information extracted based on the stereo images, a signal processing speed can be increased and the quantity of processed signals can be reduced during object detection.

The object detector 434 may detect an object on the basis of image segmentation of the segmentation unit 432. For example, the object detector 434 may detect an object from at least one image on the basis of the disparity information.

Specifically, the object detector 434 may detect an object from at least one image. For example, the object detector 434 can detect an object from a foreground separated according to image segmentation.

An object verification unit 436 may classify and verify the detected object. To this end, the object verification unit 436 may use an identification method using a neural network, a support vector machine (SVM) method, an identification method according to AdaBoost using Haar-like characteristics, histograms of oriented gradients (HOG) or the like.

The object verification unit 436 may verify the detected object by comparing the detected object with objects stored in the memory 140. For example, the object verification unit 436 can verify vehicles, lanes, road surfaces, road signs, danger areas, tunnels and the like, located around the corresponding vehicle.

The object tracking unit 440 may track the verified object. For example, the object tracking unit 440 can verify an object included in sequentially acquired stereo images, calculate motion or a motion vector of the verified object and track movement of the object on the basis of the calculated motion or motion vector. Accordingly, the object tracking unit 440 can track vehicles, lanes, road surfaces, road signs, danger zones, tunnels and like around the corresponding vehicle.

The application unit 450 may calculate a degree of car accident risk of the vehicle 700 on the basis of various objects around the vehicle, for example, other vehicles, lanes, road surfaces, road signs and the like. In addition, the application unit 450 may calculate possibility of rear-end collision, slip of the vehicle and the like.

Furthermore, the application unit 450 may output messages for informing the user of the information on the calculated hazard, rear-end collision possibility or vehicle slip as vehicle driving assistance information on the basis of the calculated hazard, rear-end collision possibility or vehicle slip. In addition, the application unit 450 may generate a control signal for attitude control or driving control of the vehicle 700 as vehicle control information.

Figure 7:
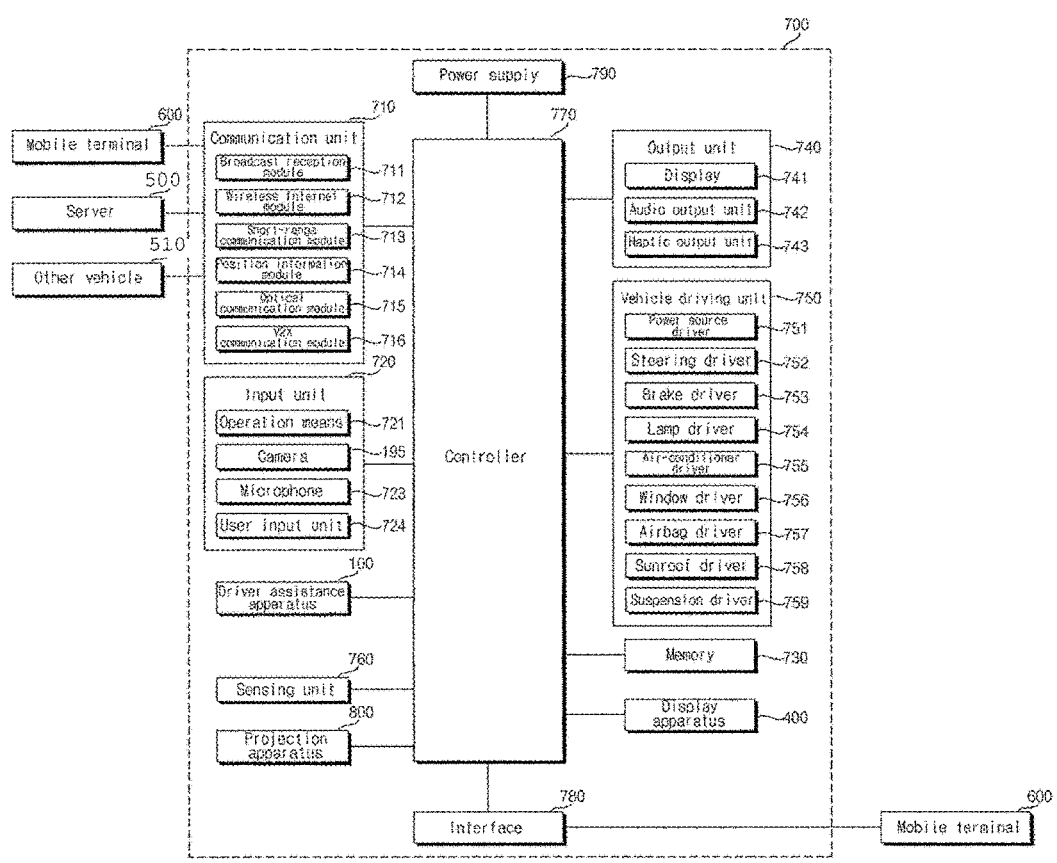
FIG. 7 is an internal block diagram illustrating an example of a vehicle including a driver assistance apparatus.

The image preprocessor 410, the disparity calculator 420, the segmentation unit 432, the object detector 434, the object verification unit 436, the object tracking unit 440 and the application unit 450 may be internal components of an image processor 401 in the processor 170 in FIG. 7 and the following figures.

The processor 170 may include part of the image preprocessor 410, the disparity calculator 420, the segmentation unit 432, the object detector 434, the object verification unit 436, the object tracking unit 440 and the application unit 450 according to an implementation. When the camera 195 is configured as a mono camera or around view cameras, the disparity calculator 420 may be excluded according to an implementation. Furthermore, the segmentation unit 432 may be excluded according to an implementation.

FIG. 4C is a block diagram of the image processor 401 according to another implementation of the present invention.

As shown, the image processor 401 of FIG. 4C has the same internal component units as the image processor 401 of FIG. 4B but differs from the image processor 401 of FIG. 4B with respect to signal processing order. Only such difference is described in the following.

The object detector 434 receives stereo images and detects an object from at least one stereo image. Distinguished from the image processor 401 shown in FIG. 4B, the object detector 434 may directly detect an object from a stereo image instead of detecting the object from segmented images on the basis of disparity information.

The object verification unit 436 classifies and verifies detected and separated objects on the basis of image segments from the segmentation unit 432 and objects detected by the object detector 434.

To this end, the object verification unit 436 may use an identification method using a neural network, a support vector machine (SVM) method, an identification method according to AdaBoost using Haar-like characteristics or histograms of oriented gradients (HOG).

Figure 5A:
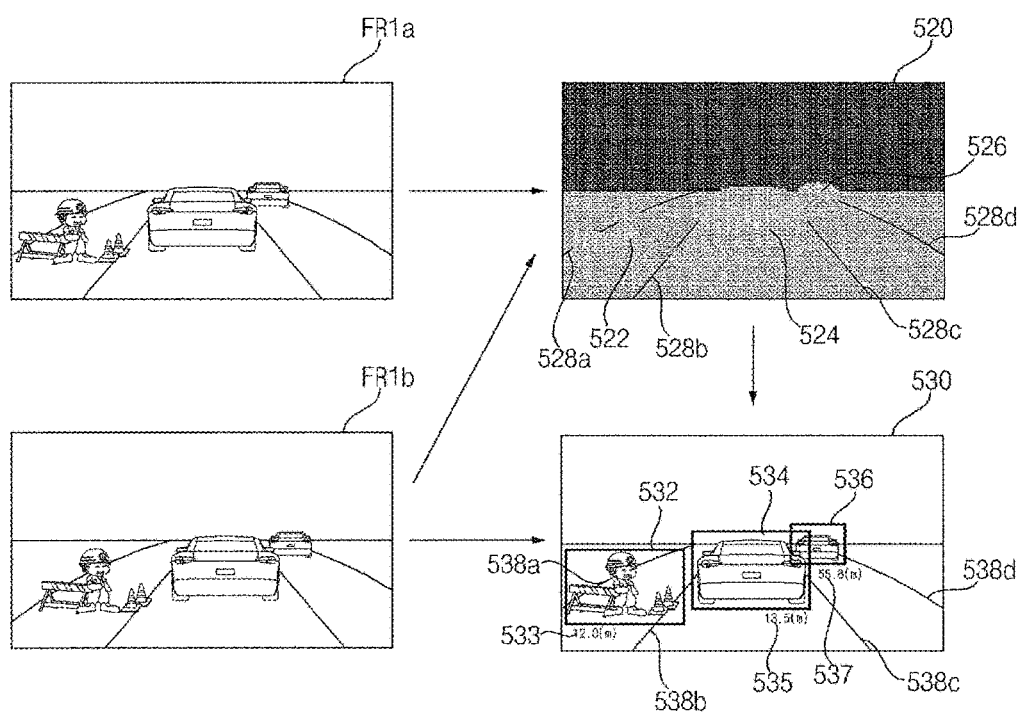
FIGS. 5A and 5B are diagrams illustrating examples of operations of a processor of a driver assistance apparatus based on stereo images acquired in first and second frame intervals.
Figure 5B:
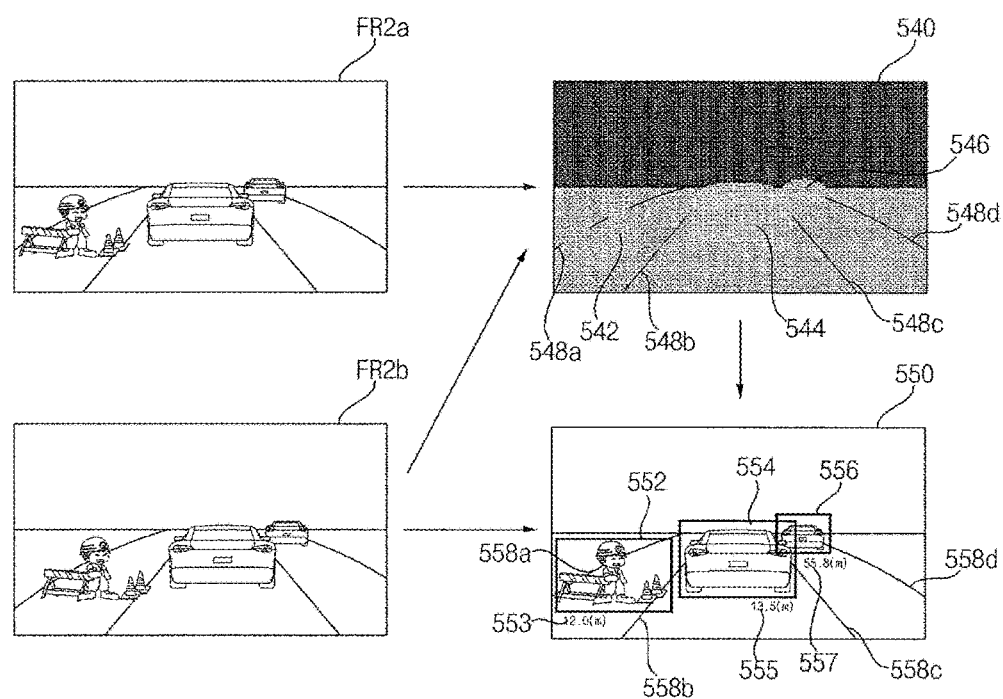

FIGS. 5A and 5B are views for explaining operation of the processor 170 shown in FIG. 4A on the basis of stereo images respectively acquired in first and second frame intervals.

Referring to FIG. 5A, the stereo camera 195 acquires stereo images in the first frame interval. The disparity calculator 420 included in the processor 170 receives stereo images FR1a and FR1b, which are processed into signals by the image preprocessor 410, and performs stereo matching on the received stereo images FR1a and FR1b so as to acquire a disparity map 520.

The disparity map 520 represents levels of disparity between the stereo images FR1a and FR1b. A distance to the vehicle is recognized to be shorter as the disparity level increases and is recognized to be longer as the disparity level decreases.

When the disparity map is displayed, a higher disparity level may be represented as higher brightness and a lower disparity level may be represented as lower brightness.

In FIG. 5A, first to fourth lanes 528a, 528b, 528c and 528d respectively have disparity levels corresponding thereto and a construction zone 522, a first preceding vehicle 524 and a second preceding vehicle 526 respectively have disparity levels corresponding thereto in the disparity map 520.

The segmentation unit 432, the object detector 434 and the object verification unit 436 respectively perform segmentation, object detection and object verification on at least one of the stereo images FR1a and FR1b on the basis of the disparity map 520.

FIG. 5A illustrates that object detection and verification are performed on the second stereo image FR1b using the disparity map 520. For example, the first to fourth lanes 538a, 538b, 538c and 538d, the construction zone 532, the first preceding vehicle 534 and the second preceding vehicle 536 in an image 530 can be detected and verified.

Referring to FIG. 5B, the stereo camera 195 acquires stereo images in the second frame interval. The disparity calculator 420 included in the processor 170 receives stereo images FR2a and FR2b, which are processed into signals by the image preprocessor 410, and performs stereo matching on the received stereo images FR2a and FR2b so as to acquire a disparity map 540.

In FIG. 5B, first to fourth lanes 548a, 548b, 548c and 548d respectively have disparity levels corresponding thereto and a construction zone 542, a first preceding vehicle 544 and a second preceding vehicle 546 respectively have disparity levels corresponding thereto in the disparity map 540.

The segmentation unit 432, the object detector 434 and the object verification unit 436 respectively perform segmentation, object detection and object verification on at least one of the stereo images FR2a and FR2b on the basis of the disparity map 540.

FIG. 5B illustrates that object detection and verification are performed on the second stereo image FR2b using the disparity map 540. For example, the first to fourth lanes 548a, 548b, 548c and 548d, the construction zone 542, the first preceding vehicle 544 and the second preceding vehicle 546 in an image 550 can be detected and verified.

The object tracking unit 440 tracks the verified objects by comparing FIG. 5A and FIG. 5B. Specifically, the object tracking unit 440 may track movement of the objects verified in FIGS. 5A and 5B on the basis of motions or motion vectors of the objects. Accordingly, the object tracking unit 440 can track the lanes, the construction zone, the first preceding vehicle and the second preceding vehicle, which are located around the corresponding vehicle.

Figure 6A:
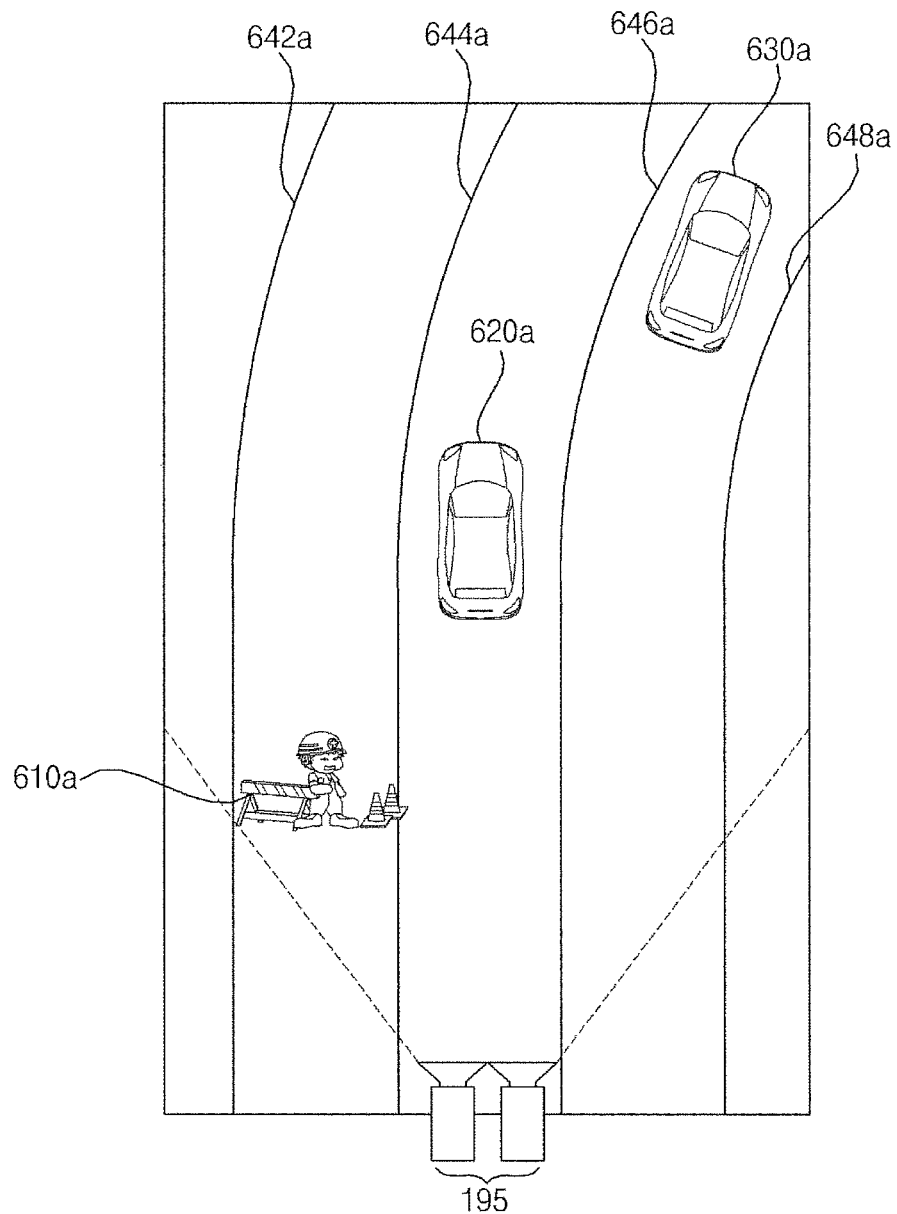
FIGS. 6A and 6B are diagrams illustrating examples of operations of a driver assistance apparatus.
Figure 6B:
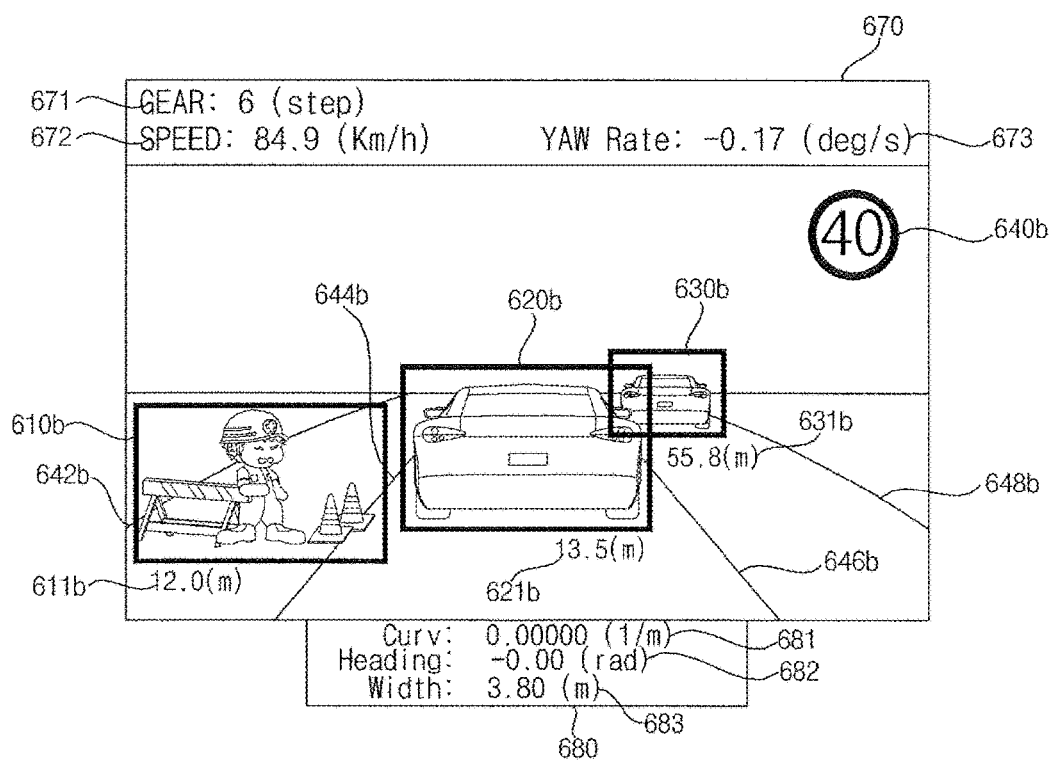

FIGS. 6A and 6B are views for explaining operation of the driver assistance apparatus shown in FIGS. 3A, 3B and 3C.

FIG. 6A illustrates a front view image of the vehicle, photographed by the stereo camera 195 included in the vehicle. Particularly, the front view image is displayed as a bird's eye view image.

Referring to FIG. 6A, first, second, third and fourth lanes 642a, 644a, 646a and 648a are present from left to right, a construction zone 610a is located between the first lane 642a and the second lane 644a, a first preceding vehicle 620a is positioned between the second lane 644a and the third lane 646a, and a second preceding vehicle 630a is positioned between the third lane 646a and the fourth lane 648a.

FIG. 6B illustrates display of situations in front of the vehicle, recognized by the driver assistance apparatus, along with various types of information. Particularly, the image shown in FIG. 6B may be displayed on the display 180 of the driver assistance apparatus, the display apparatus 400 for the vehicle or the display 741.

FIG. 6B illustrates display of information on the basis of an image captured by the stereo camera 195, distinguished from FIG. 6A.

Referring to FIG. 6B, first, second, third and fourth lanes 642b, 644b, 646b and 648b are present from left to right, a construction zone 610b is located between the first lane 642b and the second lane 644b, a first preceding vehicle 620b is positioned between the second lane 644b and the third lane 646b, and a second preceding vehicle 630b is positioned between the third lane 646b and the fourth lane 648b.

The driver assistance apparatus 100 may verify objects with respect to the construction zone 610b, the first preceding vehicle 620b and the second preceding vehicle 630b by processing stereo images acquired by the stereo cameras 195a and 195b into signals.

FIG. 6B shows that the borders of the construction zone 610b, the first preceding vehicle 620b and the second preceding vehicle 630b are highlighted in order to indicate object verification with respect to the construction zone 610b, the first preceding vehicle 620b and the second preceding vehicle 630b.

The driver assistance apparatus 100 may calculate distances between the corresponding vehicle and the construction zone 610b, the first preceding vehicle 620b and the second preceding vehicle 630b on the basis of the stereo images acquired by the stereo camera 195. FIG. 6B illustrates display of first distance information 611b, second distance information 621b and third distance information 631b respectively corresponding to the construction zone 610b, the first preceding vehicle 620b and the second preceding vehicle 630b.

The driver assistance apparatus 100 may receive sensor information about the vehicle from the controller 770 or the sensing unit 760. Particularly, the driver assistance apparatus 100 may receive a vehicle speed, gear information, a yaw rate that indicates a rotation angle (yaw angle) of the vehicle, and vehicle heading information and display the received information.

Referring to FIG. 6B, while a vehicle speed 672, gear information 671 and a yaw rate 673 are displayed on the upper part 670 of the front view image of the vehicle, and heading information 682 is displayed on the lower part 680 of the front view image of the vehicle, various other examples are possible. In addition, the width 683 of the vehicle and road curvature information 681 may be displayed along with the heading information 682.

The driver assistance apparatus 100 may receive information on a speed limit with respect to the road on which the vehicle is being driven through the communication unit 120 or the interface 130. FIG. 6B shows display of information on a speed limit 640b.

While the driver assistance apparatus 100 can display the information shown in FIG. 6B through the display 180, the driver assistance apparatus 100 may store the information without displaying the same. In addition, the driver assistance apparatus 100 may use the information for various applications.

FIG. 7 is an internal block diagram of the vehicle shown in FIG. 1.

The vehicle 700 may include a communication unit 710, an input unit 720, a sensing unit 760, an output unit 740, a vehicle driving unit 750, a memory 730, an interface 780, a controller 770, a power supply 790, the driver assistance apparatus 100 and the display apparatus 400 for the vehicle.

The communication unit 710 may include one or more modules for enabling wireless communication between the vehicle 700 and the mobile terminal 600, between the vehicle 700 and the external server 500 or between the vehicle 700 and another vehicle 510. In addition, the communication unit 710 may include one or more modules for linking the vehicle to one or more networks.

The communication unit 710 may include a broadcast reception module 711, a wireless Internet module 712, a short-range communication module 713, a position information module 714, an optical communication module 715 and a V2X communication module 716.

The broadcast reception module 711 receives broadcast signals or broadcast related information from an external broadcast management server through broadcast channels. Here, broadcast includes radio broadcast and TV broadcast.

The wireless Internet module 712 refers to a module for wireless Internet access and may be embedded in the vehicle 700 or provided to the outside of the vehicle 700. The wireless Internet module 712 is configured to transmit and receive radio signals in communication networks according to wireless Internet technologies.

The wireless Internet technologies include WLAN (Wireless LAN), Wi-Fi (Wireless-Fidelity), Wi-Fi Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced) and the like, and the wireless Internet module 712 transmits and receives data according to at least one of wireless Internet technologies including those not above-mentioned. For example, the wireless Internet module 712 can wirelessly exchange data with the external server 500. The wireless Internet module 712 can receive weather information and traffic information (e.g., TPEG (Transport Protocol Expert Group) information) from the external server 500.

The short-range communication module 713 is a module for short range communication and can support short range communication using at least one of Bluetooth™, RFID (Radio Frequency Identification), Infrared Data Association (IrDA), UWB (Ultra Wideband), ZigBee, NFC (Near Field Communication), Wi-Fi (Wireless-Fidelity), Wi-Fi Direct and Wireless USB (Wireless Universal Serial Bus).

The short-range communication module 713 can perform short-range communication between the vehicle 700 and at least one external device by establishing wireless area networks. For example, the short-range communication module 713 can exchange data with the mobile terminal 600. The short-range communication module 713 can receive weather information and traffic information (e.g., TPEG information) from the mobile terminal 600. When the user gets in the vehicle 700, the mobile terminal 600 of the user and the vehicle 700 can be paired automatically or according to execution of an application by the user.

The position information module 714 is a module for acquiring the location of the vehicle 700 and a typical example thereof is a GPS (Global Positioning System) module. For example, the vehicle can acquire the location thereof using signals sent from a GPS satellite using the GPS module.

The optical communication module 715 may include a light transmission unit and a light receiving unit. The light receiving unit converts a light signal into an electrical signal so as to receive information. The light receiving unit may include a photodiode (PD) for receiving light. The photodiode converts light into an electrical signal. For example, the light receiving unit can receive information on a preceding vehicle through light emitted from a light source included in the preceding vehicle.

The light transmission unit may include at least one light-emitting element for converting an electrical signal into a light signal. Here, the light-emitting element is preferably an LED (Light Emitting Diode). The light transmission unit converts an electrical signal into a light signal and emits the light signal. For example, the light transmission unit can emit a light signal through flickering of the light-emitting element, which corresponds to a predetermined frequency. According to an implementation, the light transmission unit may include a plurality of light-emitting element arrays. According to an implementation, the light transmission unit may be integrated with a lamp provided to the vehicle 700. For example, the light transmission unit can be at least one of a headlight, a taillight, a brake light, a turn signal lamp and a sidelight. For example, the optical transmission module 715 can exchange data with the other vehicle 510 through optical communication.

The V2X communication module 716 is a module for wireless communication between the vehicle 700 and the external server 500 or the other vehicle 510. The V2X module 716 includes a module in which a vehicle-to-vehicle communication (V2V) or vehicle-to-infrastructure communication (V2I) protocol can be implemented. The vehicle 700 can perform wireless communication with the external server 500 or the other vehicle 510 through the V2X communication module 716.

The input unit 720 may include an operation unit 721, the camera 195, a microphone 723 and a user input unit 724. The operation unit 721 receives user input for driving the vehicle 700. The operation unit 721 may include a steering input unit 721*a*, a shift input unit 721*b*, an acceleration input unit 721*c* and a brake input unit 721*d*

The user applies steering input to the steering input unit 721*a*. The steering input unit 721*a* is preferably configured in the form of a wheel such that steering input can be applied according to rotation. According to an implementation, the steering input unit 721*a* may be configured as a touchscreen, a touch pad or a button.

The user applies inputs with respect to parking P, driving (D), neutral (N), reverse (R) of the vehicle 700 through the shift input unit 721*b*. The shift input unit 721*b* is preferably configured in the form of a lever. According to an implementation, the shift input unit 721*b* may be configured in the form of a touchscreen, a touch pad or a button.

The user applies input with respect to acceleration of the vehicle 700 through the acceleration input unit 721*c*. The user applies input with respect to reduction of the speed of the vehicle 700 to the brake input unit 721*d*. The acceleration input unit 721*c* and the brake input unit 721*d* are preferably configured in the form of a pedal. According to an implementation, the acceleration input unit 721*c* or the brake input unit 721*d* may be configured in the form of a touchscreen, a touch pad or a button.

The camera 195 may include an image sensor and an image processing module. The camera 195 may process still images or video acquired through the image sensor (e.g., CMOS or CCD). The image processing module may process still images or video acquired through the image sensor to extract necessary information and transmit the extracted information to the controller 770. The vehicle 700 may include the camera 195 for photographing a front view image or an around view image of the vehicle and an internal camera 195*c* for photographing the inside of the vehicle.

The internal camera 195*c* may acquire an image of a person who enters the vehicle. The internal camera 195*c* may acquire an image for biometrics of the person. In addition, the internal camera 195*c* may detect the number of people getting in the vehicle by acquiring an image of the people.

While FIG. 7 shows that the camera 195 is included in the input unit 720, the camera 195 may be included in the driver assistance apparatus 100 as described above with reference to FIGS. 2A to 6B.

The microphone 723 may process an external audio signal into electrical data. The processed data may be used in various manners according to functions executed in the vehicle 700. The microphone 723 may convert a voice command of the user into electrical data. The converted electrical data may be transmitted to the controller 770.

According to an implementation, the camera 195 or the microphone 723 may be included in the sensing unit 760 instead of the input unit 720.

The user input unit 724 is used to receive information from the user. Upon input of information through the user input unit 724, the controller 770 may control operation of the vehicle 700 to respond to the input information. The user input unit 724 may include a touch type input unit or a mechanical input unit. According to an implementation, the user input unit 724 may be provided to a region of the steering wheel of the vehicle. In this case, the driver can operate the user input unit 724 with a finger while gripping the steering wheel.

The sensing unit 760 senses signals related to driving of the vehicle 700 and the like. To this end, the sensing unit 760 may include a collision sensor, a wheel sensor, a speed sensor, a tilt sensor, a weight sensor, a heading sensor, a yaw sensor, a gyro sensor, a position module, a front side/rear side sensor, a battery sensor, a fuel sensor, a tire sensor, a steering sensor, a vehicle internal temperature sensor, a vehicle internal humidity sensor, an ultrasonic sensor, radar, lidar and the like.

Accordingly, the sensing unit 760 may acquire sensing signals with respect to vehicle collision information, vehicle position information (GPS information), heading information, speed information, acceleration information, vehicle tilt information, driving/reversing information, battery information, fuel information, tire information, vehicle lamp information, vehicle internal temperature information, vehicle internal humidity information, steering wheel rotation angle information and the like.

In addition, the sensing unit 760 may further include an acceleration pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS) and the like.

Furthermore, the sensor unit 760 may include a biometric information sensor. The biometric information sensor senses and acquires biometric information of a person getting in the car. The biometric information may include fingerprint information, iris-scan information, retina-scan information, hand geometry information, facial recognition information and voice recognition information. The biometric information sensor may include a sensor for sensing biometric information of the person getting in the vehicle. Here, the internal camera 195*c* and the microphone 723 can operate as a sensor. The biometric information sensor can acquire information on a hand and face recognition information through the internal camera 195*c*.

The output unit 740 outputs information processed in the controller 770 and may include the display, an audio output unit 742 and a haptic output unit 743. The display 741 may display information processed in the controller 770. For example, the display 741 can display vehicle related information. The vehicle related information may include vehicle control information for direct control of the vehicle or vehicle driving assistance information for providing driving guidance to the vehicle driver. In addition, the vehicle related information may include vehicle state information indicating the current state of the vehicle or vehicle driving information related to driving of the vehicle.

The display 741 may include at least one of a liquid crystal display (LCD), a thin film transistor-liquid crystal display (TFT LCD), an organic light-emitting diode (OLED), a flexible display, a 3D display and an e-ink display.

The display 741 may implement a touchscreen by forming a layered structure with a touch sensor or by being integrated with the touch sensor. Such touchscreen can function as the user input unit 724 that provides an input interface between the vehicle 700 and the user and, simultaneously, provide an output interface between the vehicle 700 and the user. In this case, the display 741 may include a touch sensor for sensing touch applied to the display 741 such that a control command is input to the display 741 through touch. When touch is applied to the display 741, the touch sensor can sense the touch and the controller 770 can generate a control command corresponding to the touch on the basis of the sensed touch. Input applied through touch may be text, figures or menu items that can be indicated or designated in various modes.

The display 741 may include a cluster to enable the driver to drive the vehicle and, simultaneously, to check vehicle state information or vehicle driving information. The cluster may be provided on the dashboard. In this case, the driver can check information displayed on the cluster while looking forward.

According to an implementation, the display 741 may be implemented as an HUD (Head Up Display). When the display 741 is implemented as an HUD, information can be output through a transparent display provided to the windshield of the vehicle. Alternatively, the display 741 may include a projection module so as to output information through an image projected to the windshield.

The audio output unit 742 outputs an electrical signal from the controller 770 into an audio signal and outputs the audio signal. To this end, the audio output unit 742 may include a speaker. The audio output unit 742 can output sound corresponding to operation of the user input unit 724.

The haptic output unit 743 generates haptic output. For example, the haptic output unit 743 can vibrate the steering wheel, a safety belt or a seat to enable the user to recognize haptic output.

The vehicle driving unit 750 may control operations of various devices of the vehicle. The vehicle driving unit 750 may include a power source driver 751, a steering driver 752, a brake driver 753, a lamp driver 754, an air-conditioner driver 755, a window driver 756, an airbag driver 757, a sunroof driver 758 and a suspension driver 759.

The power source driver 751 can perform electronic control of a power source of the vehicle 700. For example, when the power source is a fossil fuel based engine, the power source driver 751 can perform electronic control of the engine so as to control the output torque of the engine. When the power source driver 751 is an engine, the speed of the vehicle can be limited by restricting an engine output torque under the control of the controller 770.

Alternatively, when an electric motor is a power source, the power source driver 751 can control the motor. Accordingly, revolutions per minute (RPM), torque and the like of the motor can be controlled.

The steering driver 752 may electronically control a steering apparatus of the vehicle 700 so as to steer the vehicle 700.

The brake driver 753 may electronically control a brake apparatus of the vehicle 700. For example, the brake driver 753 can reduce the speed of the vehicle 700 by controlling the operation of a brake provided to the wheels. As another example, the brake driver 753 can adjust the direction of the vehicle 700 to the left or right by differently operating brakes respectively provided to the left and right wheels.

The lamp driver 754 may turn on/turn off lamps provided to the inside and outside of the vehicle 700. In addition, the lamp driver 754 may control illuminance, directions and the like of the lamps. For example, the lamp driver 754 can control the turn signal, brake lamp and the like.

The air-conditioner driver 755 may electronically control an air conditioner of the vehicle 700. For example, the air-conditioner driver 755 can control the air conditioner to supply chilly air to the inside of the vehicle 700 when the internal temperature of the vehicle is high.

The window driver 756 may electronically control a window apparatus of the vehicle 700. For example, the window driver 756 can control opening or closing of left and right windows provided to the side of the vehicle.

The airbag driver 757 may electronically control an airbag apparatus provided to the inside of the vehicle 700. For example, the airbag driver 757 can control the airbag apparatus to operate in a dangerous situation.

The sunroof driver 758 may electronically control a sunroof apparatus of the vehicle 700. For example, the sunroof driver 758 can control opening or closing of a sunroof.

The suspension driver 759 may electronically control a suspension apparatus of the vehicle 700. For example, the suspension driver 759 can reduce vibration of the vehicle 700 by controlling the suspension apparatus when the surface of the road is rough.

The memory 730 is electrically connected to the controller 770. The memory 730 may store fundamental data about the units, control data for operation control of the units and input/output data. The memory 730 may be various types of storage devices such as a ROM, a RAM, an EPROM, a flash drive and a hard drive. The memory 730 may store various types of data for the overall operation of the vehicle 700, such as programs for processing or control.

The interface 780 may function as a passage to various external devices connected to the vehicle 700. For example, the interface 780 can include a port that can be connected to the mobile terminal 600 and be connected to the mobile terminal 600 via the port. In this case, the interface 780 can exchange data with the mobile terminal 600.

In addition, the interface 780 may serve as a passage through which electric energy is supplied to the mobile terminal 600 connected thereto. When the mobile terminal 600 is electrically connected to the interface 780, the interface 780 provides electric energy supplied from the power supply 790 to the mobile terminal 600 under the control of the controller 770.

The controller 770 may control operations of the respective units of the vehicle 700. The controller 770 may be called an ECU (Electronic Control Unit).

The controller 770 may receive information on collision with an object from a collision sensor included in the sensing unit 760.

The controller 770 may receive, from the driver assistance apparatus 100, a first control signal for disabling hood lift-up and/or a second control signal for disabling pedestrian protection airbag deployment. The controller 770 may process the first control signal or the second control signal prior to the collision information being received from the sensing unit 760.

For example, when the vehicle 700 collides with a person or a two-wheeled vehicle with a passenger riding thereon, the controller 770 may disable the hood lift-up operation or the pedestrian protection airbag deploying operation by processing a control signal received from the driver assistance apparatus 100 prior to the collision information sensed by the collision sensor.

The controller 770 may be implemented using at least one of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors) and other electrical units for executing the corresponding functions.

The power supply 790 may supply power necessary for operations of the respective components under the control of the controller 770. Particularly, the power supply 790 may be provided with power from a battery inside the vehicle 700.

The driver assistance apparatus 100 may exchange data with the controller 770. A control signal generated in the driver assistance apparatus 100 may be output to the controller 770. The driver assistance apparatus 100 may be the driver assistance apparatus described above with reference to FIGS. 1 to 6B.

The display apparatus 400 for the vehicle may exchange data with the controller 770. The controller 770 may receive navigation information from the display apparatus 400 or a separate navigation system. Here, the navigation information may include information on a set destination, route information depending on the destination, map information regarding vehicle driving and vehicle location information.

Figure 8A:
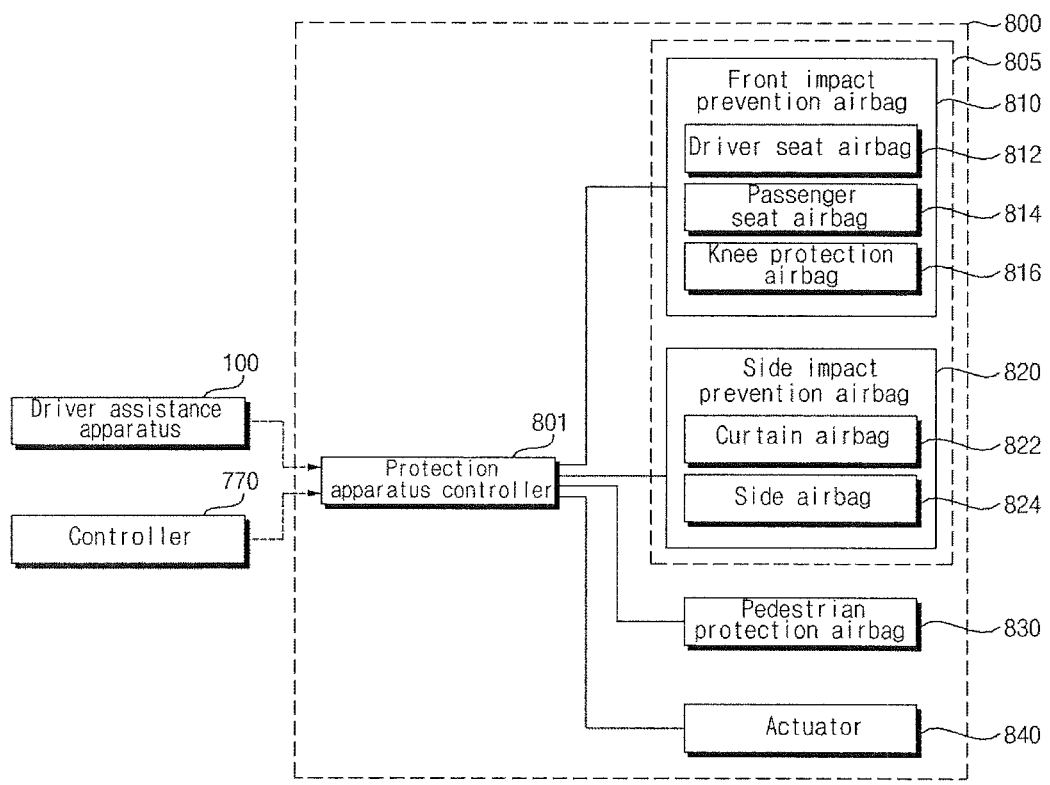
FIGS. 8A and 8B are block diagrams illustrating examples of a protection apparatus for a driver assistance apparatus.
Figure 8B:
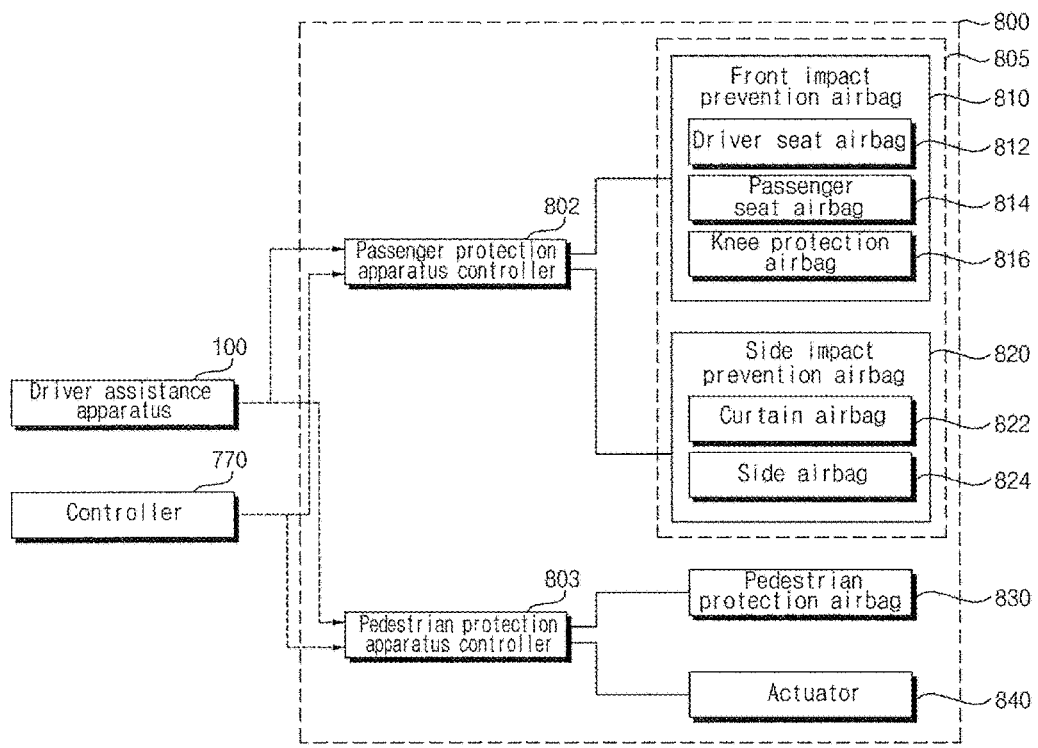

FIGS. 8A and 8B are block diagrams of the protection apparatus according to some implementations.

FIG. 8A is a block diagram of the protection apparatus according to an implementation. Referring to FIG. 8A, the protection apparatus may include a protection apparatus controller 801, an indoor airbag 805, a pedestrian protection airbag 830 and an actuator 840.

The protection apparatus controller 801 may receive a control signal from the driver assistance apparatus 100. The protection apparatus controller 801 may receive the control signal from the driver assistance apparatus 100 directly or via the controller 770.

For example, the protection apparatus controller 801 may receive, from the driver assistance apparatus 100, a control signal for performing or disabling a hood lift-up operation. As another example, the protection apparatus controller 801 may receive, from the driver assistance apparatus 100, a control signal for performing or disabling a pedestrian protection airbag deployment operation. As a further example, the protection apparatus controller 801 may receive, from the driver assistance apparatus 100, a control signal for performing or disabling an indoor airbag operation.

The indoor airbag 805 may include, in some implementations, a front impact prevention airbag 810 and a side impact prevention airbag 820. The front impact prevention airbag 810 may be an airbag configured to prevent impact due to collision between a passenger and an object (e.g. cockpit module, steering wheel, windshield or seat) located in front of the passenger during collision. The front impact prevention airbag 810 may include a driver seat airbag 812, a passenger seat airbag 814 and a knee protection airbag 816.

The side impact prevention airbag 820 may be an airbag configured to prevent impact due to collision between a passenger and an object (e.g., a side window glass, an A-pillar, a B-pillar or C-pillar) located on a lateral side of the passenger during collision. The side impact prevention airbag 820 may include, in some implementations, a curtain airbag 822 and a side airbag 824.

The protection apparatus controller 801 may control operation of the indoor airbag 805, the pedestrian protection airbag 830, or the actuator 840 based on the received control signal.

When a control signal for performing front impact prevention airbag deployment is received, the protection apparatus controller 801 may control the front impact prevention airbag 810 to be deployed. When a control signal for disabling front impact prevention airbag deployment is received, the protection apparatus controller 801 may control the front impact prevention airbag 810 not to be deployed.

When a control signal for performing side impact prevention airbag deployment is received, the protection apparatus controller 801 may control the side impact prevention airbag 820 to be deployed. When a control signal for disabling side impact prevention airbag deployment is received, the protection apparatus controller 801 may control the side impact prevention airbag 820 not to be deployed.

When a control signal for performing pedestrian protection airbag deployment is received, the protection apparatus controller 801 may control the pedestrian protection airbag 830 to be deployed. When a control signal for disabling pedestrian protection airbag deployment is received, the protection apparatus controller 801 may control the pedestrian protection airbag 830 not to be deployed.

When a control signal for performing hood lift-up is received, the protection apparatus controller 801 may control operation of the actuator 840 to lift the hood. In some implementations, the actuator 840 is provided in proximity to the windshield to lift the hood at a point at which collision of the vehicle with the upper body of a person is expected. The protection apparatus 800 may further include a power transmitter for transmitting power generated in the actuator 840 to the hood. In addition, the protection apparatus 800 may further include an impact absorber for absorbing impact during collision with a person. The impact-absorber is preferably formed of an elastic material.

When a control signal for disabling hood lift-up is received, the protection apparatus controller 801 may control operation of the actuator 840 such that the hood is not lifted.

FIG. 8B is a block diagram of the protection apparatus according to another implementation.

The protection apparatus shown in FIG. 8B differs from the protection apparatus 800 shown in FIG. 8A in that the former includes a passenger protection apparatus controller 802 and a pedestrian protection apparatus controller 803 instead of the protection apparatus controller 801. The following description is based on such difference.

While the protection apparatus 800 of FIG. 8A is configured such that the protection apparatus controller 801 controls the indoor airbag 805, the pedestrian protection airbag 830 and the actuator 840, the protection apparatus 800 of FIG. 8B is configured such that the passenger protection apparatus controller 802 controls the indoor airbag 805 and the pedestrian protection apparatus controller 803 controls the pedestrian protection airbag 830 and the actuator 840.

The passenger protection apparatus controller 802 may receive a control signal for performing or disabling indoor airbag deployment from the driver assistance apparatus 100. The passenger protection apparatus controller 802 may control deployment of the indoor airbag 805 on the basis of the received control signal.

When a control signal for performing front impact prevention airbag deployment is received, the passenger protection apparatus controller 802 may control the front impact prevention airbag 810 to be deployed. When a control signal for disabling front impact prevention airbag deployment is received, the passenger protection apparatus controller 802 may control the front impact prevention airbag 810 not to be deployed.

When a control signal for performing side impact prevention airbag deployment is received, the passenger protection apparatus controller 802 may control the side impact prevention airbag 820 to be deployed. When a control signal for disabling side impact prevention airbag deployment is received, the passenger protection apparatus controller 802 may control the side impact prevention airbag 820 not to be deployed.

The pedestrian protection apparatus controller 803 may receive a control signal for pedestrian protection airbag deployment or hood lift up from the driver assistance apparatus 100. The pedestrian protection apparatus controller 803 may control pedestrian protection airbag deployment or hood lift up on the basis of the received control signal.

When a control signal for performing pedestrian protection airbag deployment is received, the pedestrian protection apparatus controller 803 may control the pedestrian protection airbag 830 to be deployed. When a control signal for disabling pedestrian protection airbag deployment is received, the pedestrian protection apparatus controller 803 may control the pedestrian protection airbag 830 not to be deployed.

When a control signal for performing hood lift-up is received, the pedestrian protection apparatus controller 803 may control operation of the actuator 8409 to lift the hood. When a control signal for disabling hood lift-up is received, the pedestrian protection apparatus controller 803 may control operation of the actuator 8409 such that the hood is not lifted.

Figure 9A:
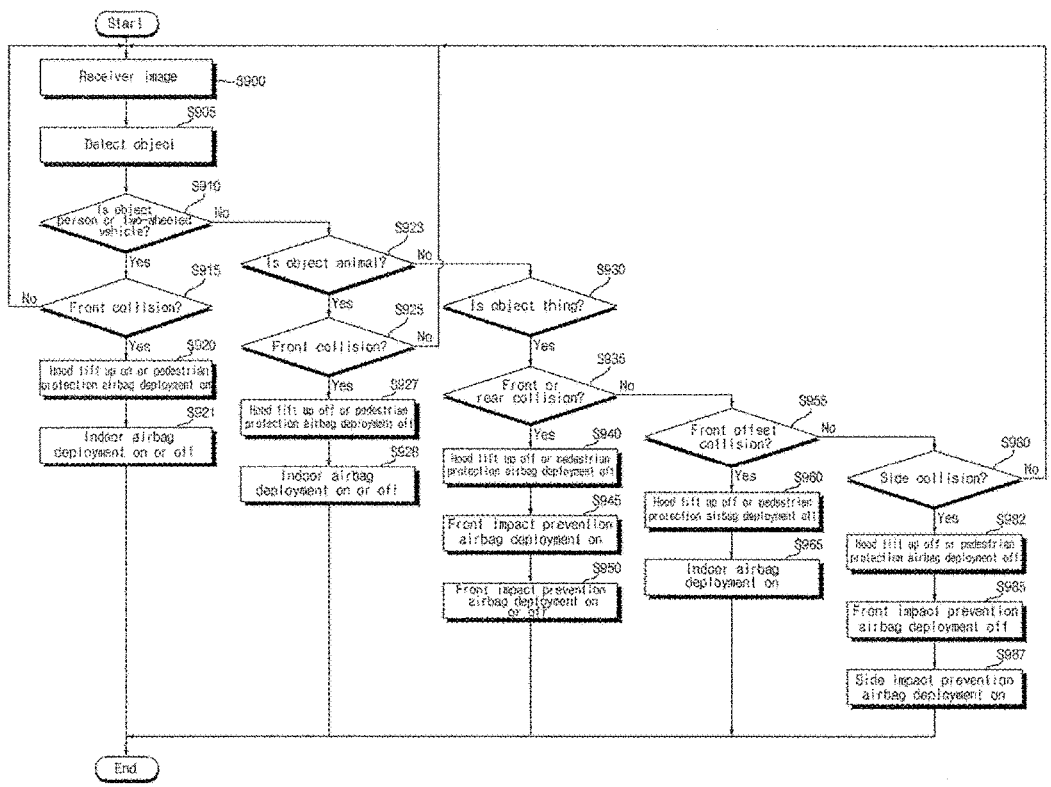
FIG. 9A is a flowchart illustrating an example of an operation of a driver assistance apparatus.

FIG. 9A is a flowchart illustrating operation of the driver assistance apparatus according to an implementation.

Referring to FIG. 9A, the processor 170 may receive an image from the camera 195 (S900). The image may be a front view image or an around view image of the vehicle.

The processor 170 may detect an object from the received image (S905). Here, the object may be a person, two-wheeled vehicle with a person riding thereon, an animal or an inanimate object.

When the object is a person or a two-wheeled vehicle (S910) and front collision occurs (S915), the processor 170 may provide a control signal for hood lift up on or pedestrian protection airbag deployment on (S920).

When the object is a person or a two-wheeled vehicle (S910) and front collision occurs (S915), the processor 170 may provide a control signal for indoor airbag deployment on or off (S921).

When the vehicle speed is less than a reference value, the processor 170 may provide a control signal for indoor airbag deployment off. When the vehicle speed exceeds the reference value, the processor 170 may provide a control signal for indoor airbag deployment on.

When the object is an animal (S923) and front collision occurs (S925), the processor 170 may provide a control signal for hood lift up off or pedestrian protection airbag deployment off (S927).

When the object is animal (S923) and front collision occurs (S925), the processor 170 may provide a control signal for indoor airbag deployment on or off (S928).

When the size of the detected animal is less than a reference size, the processor 170 may provide a control signal for indoor airbag deployment off. When the size of the detected animal is greater than the reference size, the processor 170 may provide a control signal for indoor airbag deployment on.

When the object is an inanimate object (S930) and front collision or rear collision occurs (S935), the processor 170 may provide a control signal for hood lift up off or pedestrian protection airbag deployment off (S940).

When the object is an inanimate object (S930) and front collision or rear collision occurs (S935), the processor 170 may provide a control signal for front impact prevention airbag deployment on.

When the object is an inanimate object (S930) and front collision or rear collision occurs (S935), the processor 170 may provide a control signal for side impact prevention airbag deployment on or off (S950).

When the object is an inanimate object (S930) and front collision or rear collision occurs (S935), the processor 170 may provide a control signal for side impact prevention airbag deployment off, in general.

However, when movement of the position of the head of a passenger to the right or left of the vehicle direction of travel is sensed, the processor 170 may provide a control signal for side impact prevention airbag deployment on.

When the object is an inanimate object (S930) and front off collision occurs (S955), the processor 170 may provide a control signal for hood lift up off or pedestrian protection airbag deployment off (S960).

When the object is an inanimate object (S930) and front offset collision occurs (S955), the processor 170 may provide a control signal for indoor airbag deployment on (S965).

When the object is an inanimate object (S930) and side collision occurs (S980), the processor 170 may provide a control signal for hood lift up off or pedestrian protection airbag deployment off (S982).

When the object is an inanimate object (S930) and side collision occurs (S980), the processor 170 may provide a control signal for front impact prevention airbag deployment off (985).

When the object is an inanimate object (S930) and side collision occurs (S980), the processor 170 may provide a control signal for side impact prevention airbag deployment on (987).

Figure 9B:
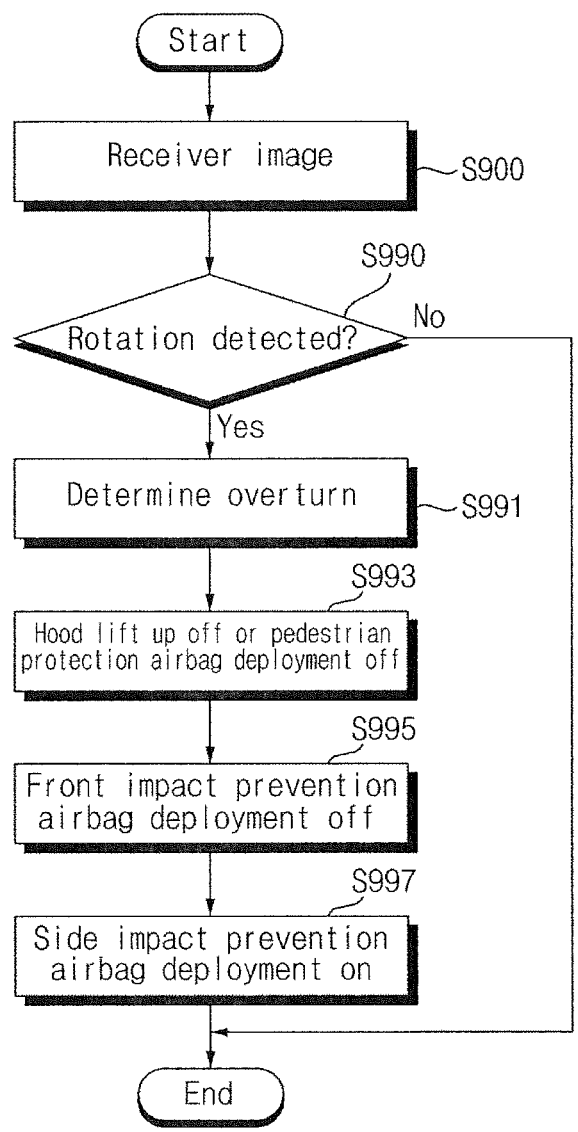
FIG. 9B is a flowchart illustrating an example of an operation of a driver assistance apparatus.

FIG. 9B is a flowchart illustrating operation of the driver assistance apparatus according to another implementation.

Referring to FIG. 9B, the processor 170 may receive an image from the camera 195 (S900). The image may be a front view image of an around view image of the vehicle.

When rotation in a predetermined direction is detected from the image (S990), the processor 170 may determine that a rollover accident has occurred (S993). For example, when rotation on an axis in the overall length direction L of the vehicle 700 is detected through an image of the rotation, the determination unit 460 can determine that a rollover accident has occurred.

Upon determination of occurrence of the rollover accident, the processor 170 may provide a control signal for hood lift up off or pedestrian protection airbag deployment off (S993).

Upon determination of occurrence of the rollover accident, the processor 170 may provide a control signal for front impact prevention airbag deployment off (S995).

Upon determination of occurrence of the rollover accident, the processor 170 may provide a control signal for side impact prevention airbag deployment on (S997).

It is possible to prevent unnecessary hood lift up or pedestrian protection airbag deployment by controlling hood lift up operation or pedestrian protection airbag deploying operation on the basis of a direction in which collision occurs and the type of an object colliding with the vehicle.

In addition, it is possible to reduce airbag replacement costs due to unnecessary indoor airbag deployment by controlling the indoor airbag to be unfolded adaptively to collision type.

FIGS. 10A to 16B are views for explaining hood lift up operation, pedestrian protection airbag deploying operation or indoor airbag deploying operation on the basis of objects and collision patterns according to some implementations.

FIGS. 10A to 10D illustrate operations of the driver assistance apparatus 100 and the protection apparatus 800 when front collision between the vehicle 700 and a pedestrian 1010 occurs according to an implementation.

Figure 10A:
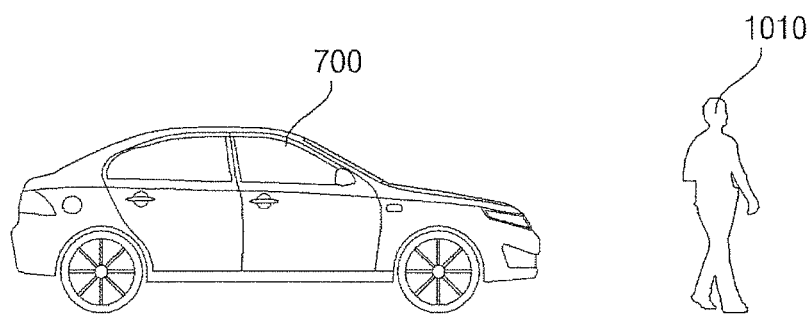
FIGS. 10A to 16B are diagrams illustrating examples of a hood lift-up operation, a pedestrian protection airbag deploying operation, and an indoor airbag deploying operation based on detecting an object and a collision pattern.
Figure 10B:
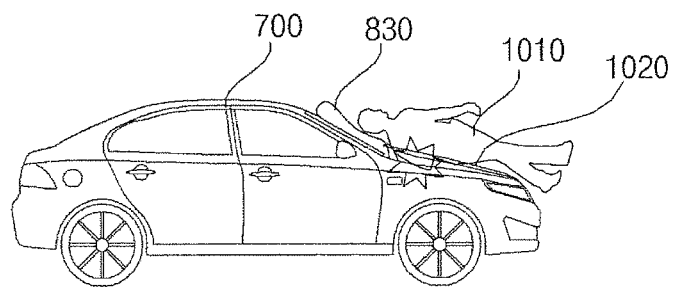

Referring to FIGS. 10A and 10B, the vehicle 700 may collide with the pedestrian during driving. In this case, the driver assistance apparatus 100 can acquire an image and detect the pedestrian 1010 from the acquired image. In addition, the driver assistance apparatus 100 can detect that collision with the pedestrian 1010 is front collision on the basis of the acquired image.

Upon detection of front collision with the pedestrian 1010, the driver assistance apparatus 100 can provide control signals for hood lift up on and pedestrian protection airbag deployment on to the protection apparatus 800.

The protection apparatus 800 can lift the hood 1020 by controlling the actuator 840. In addition, the protection apparatus 800 can deploy the pedestrian protection airbag 830.

In this manner, unnecessary hood lift up and pedestrian protection airbag deployment can be prevented by detecting a colliding object and a collision pattern and controlling hood lift up and pedestrian protection airbag deployment on the basis of the object and collision pattern.

If the hood is lifted when the vehicle 700 collides with another vehicle, the hood for absorbing impact or functioning as a support cannot work and thus a passenger of the vehicle may be in danger.

When minor collision with another vehicle occurs and thus the pedestrian protection airbag 830 is deployed, pedestrian protection airbag replacement expenses are generated.

The driver assistance apparatus 100 according to some implementations addresses this problem.

Figure 10C:
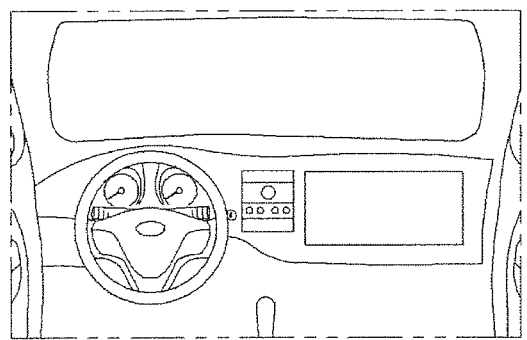
Figure 10C:
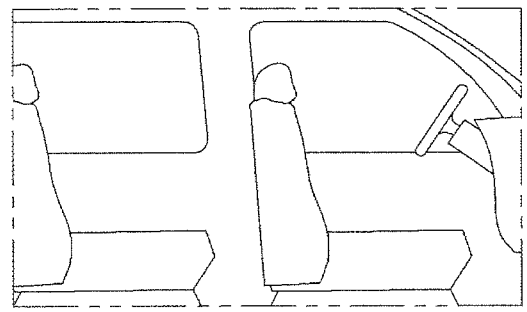

Referring to FIG. 10C, upon detection of front collision with the pedestrian 1010, the driver assistance apparatus 100 can provide a control signal for indoor airbag deployment off to the protection apparatus 800.

The protection apparatus 800 can control the indoor airbag 805 not to be deployed. When the driver assistance apparatus 100 detects front collision with the pedestrian 1010, the protection apparatus 800 can control the indoor airbag 805 not to be deployed even if collision information acquired by a collision sensor is received.

In this manner, airbag replacement expenses due to unnecessary indoor airbag deployment can be reduced by preventing deployment of the indoor airbag 805 in the case of collision with the pedestrian 1010, which does not threaten the security of the passenger.

Figure 10D:
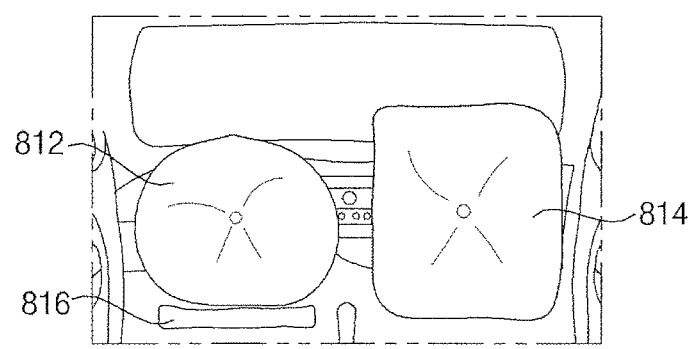
Figure 10D:
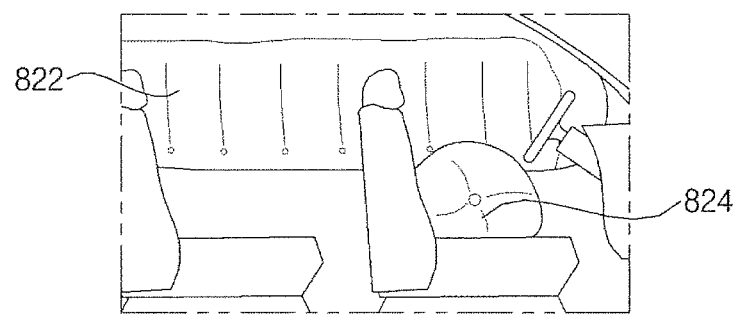

Referring to FIG. 10D, when front collision with the pedestrian 1010 is detected, the driver assistance apparatus 100 can provide a control signal for indoor airbag deployment on to the protection apparatus 800 if the vehicle speed exceeds a reference value. The protection apparatus 800 can control the indoor airbag 805 to be deployed.

The driver assistance apparatus 100 can provide control signals for front impact prevention airbag deployment on and side impact prevention airbag deployment off to the protection apparatus 800 according to an implementation. The protection apparatus 800 can control the front impact prevention airbag 810 to be deployed and control the side impact prevention airbag 820 not to be deployed.

When the vehicle speed exceeds the reference value, it is possible to determine whether to deploy the indoor airbag 905 since impact may be applied to the passenger even if the vehicle collides with the pedestrian 1010.

FIGS. 11A to 11D illustrate operations of the driver assistance apparatus 100 and the protection apparatus 800 when front collision between the vehicle 700 and a two-wheeled vehicle 1110 with a passenger riding thereon occurs according to an implementation.

Figure 11A:
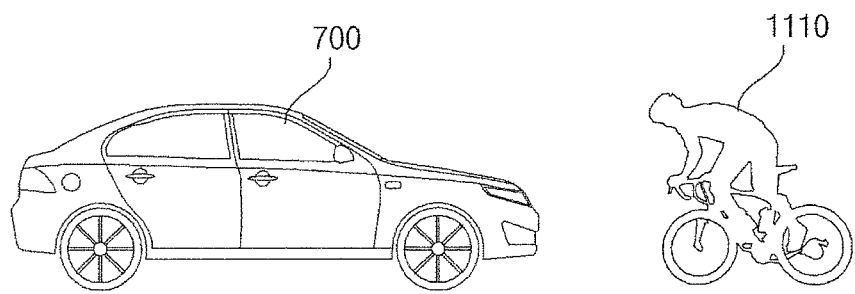
Figure 11B:
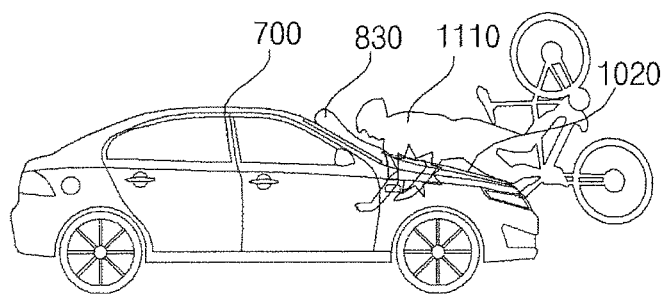

Referring to FIGS. 11A and 11B, the vehicle 700 may collide with the two-wheeled vehicle 1110 with a passenger riding thereon during driving. In this case, the driver assistance apparatus 100 can acquire an image and detect the two-wheeled vehicle 1110 with a passenger riding thereon from the acquired image. In addition, the driver assistance apparatus 100 can detect that collision with the two-wheeled vehicle 1110 is front collision on the basis of the acquired image.

Upon detection of front collision with the two-wheeled vehicle 1110 with a passenger riding thereon, the driver assistance apparatus 100 can provide the control signals for hood lift up on and pedestrian protection airbag deployment on to the protection apparatus 800.

The protection apparatus 800 can lift the hood 1020 by controlling the actuator 840. In addition, the protection apparatus 800 can deploy the pedestrian protection airbag 830.

In this manner, unnecessary hood lift up and pedestrian protection airbag deployment can be prevented by detecting a colliding object and a collision pattern and controlling hood lift up and pedestrian protection airbag deployment on the basis of the object and collision pattern.

If the hood is lifted when the vehicle 700 collides with another vehicle, the hood for absorbing impact or functioning as a support cannot work and thus the passenger may be in danger.

When minor collision with another vehicle occurs and thus the pedestrian protection airbag 830 is deployed, pedestrian protection airbag replacement expenses are generated.

The driver assistance apparatus 100 according to an implementation addresses such problems.

Figure 11C:
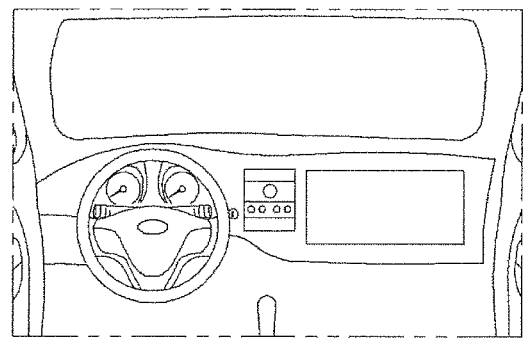
Figure 11C:
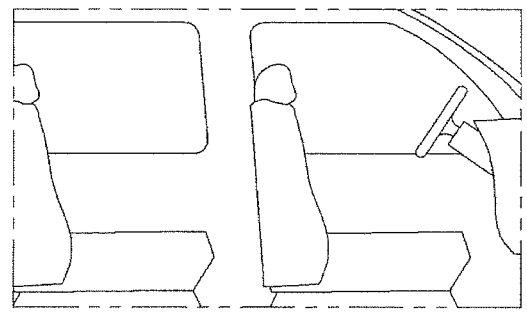

Referring to FIG. 11C, upon detection of front collision with the two-wheeled vehicle 1110 with a passenger riding thereon, the driver assistance apparatus 100 can provide the control signal for indoor airbag deployment off to the protection apparatus 800.

The protection apparatus 800 can control the indoor airbag 805 not to be deployed. When the driver assistance apparatus 100 detects front collision with the two-wheeled vehicle 1110 with a passenger riding thereon, the protection apparatus 800 can control the indoor airbag 805 not to be deployed even if collision information acquired by a collision sensor is received.

In this manner, airbag replacement expenses due to unnecessary indoor airbag deployment can be reduced by preventing deployment of the indoor airbag 805 in the case of collision with the two-wheeled vehicle 1110 with a passenger riding thereon, which does not threaten the security of the passenger.

Figure 11D:
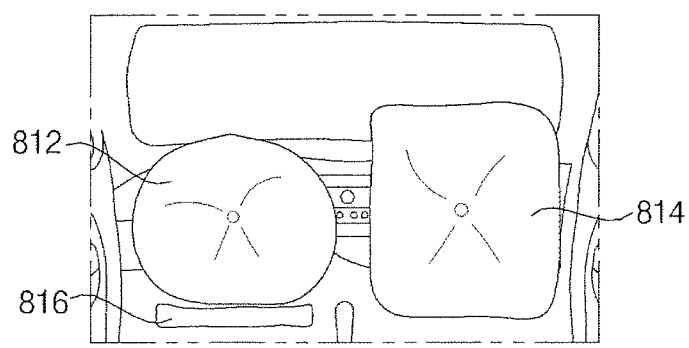
Figure 11D:
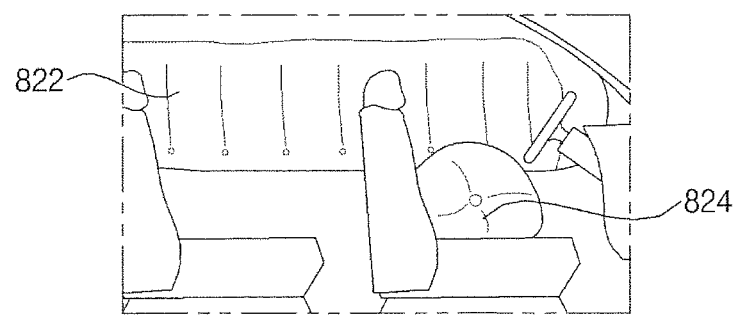

Referring to FIG. 11D, when front collision with the two-wheeled vehicle 1110 with a passenger riding thereon is detected, the driver assistance apparatus 100 can provide the control signal for indoor airbag deployment on to the protection apparatus 800 if the vehicle speed exceeds a reference value. The protection apparatus 800 can control the indoor airbag 805 to be deployed.

The driver assistance apparatus 100 can provide the control signals for front impact prevention airbag deployment on and side impact prevention airbag deployment off to the protection apparatus 800 according to some implementations. The protection apparatus 800 can control the front impact prevention airbag 810 to be deployed and control the side impact prevention airbag 820 not to be deployed.

When the vehicle speed exceeds the reference value, it is possible to determine whether to deploy the indoor airbag 905 since impact may be applied to the passenger even if the vehicle collides with the two-wheeled vehicle 1110 with a passenger riding thereon.

FIGS. 12A to 12D illustrate operations of the driver assistance apparatus 100 and the protection apparatus 800 when front collision between the vehicle 700 and animal 1210 occurs according to an implementation.

Figure 12A:
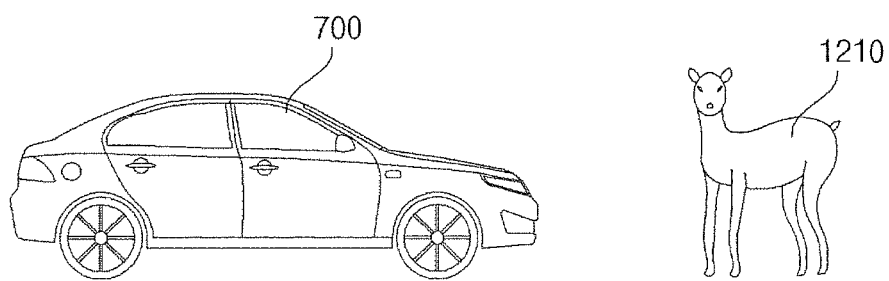
Figure 12B:
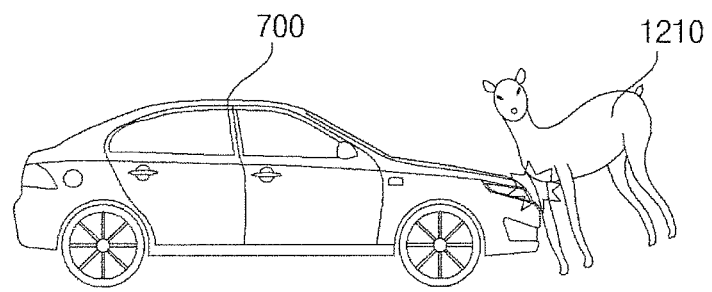

Referring to FIGS. 12A and 12B, the vehicle 700 may collide with the animal 1210 during driving. In this case, the driver assistance apparatus 100 can acquire an image and detect the animal 1210 from the acquired image. In addition, the driver assistance apparatus 100 can detect that collision with the animal 1210 is front collision on the basis of the acquired image.

Upon detection of front collision with the animal 1210, the driver assistance apparatus 100 can provide control signals for hood lift up off and pedestrian protection airbag deployment off to the protection apparatus 800.

The protection apparatus 800 can control the hood 1020 and the pedestrian protection airbag 830 such that the hood is not lifted and the pedestrian protection airbag is not deployed.

In the case of front collision with the animal 1210, hood lift up on/off and pedestrian protection airbag on/off can be determined by the user. When hood lift up on and pedestrian protection airbag deployment on are set for front collision with the animal 1210, through the input unit 110 of the driver assistance apparatus 100 or the input unit 720 of the vehicle 700, the driver assistance apparatus 10 can provide control signals for hood lift up on and pedestrian protection airbag on to the protection apparatus 800 in the event of front collision with the animal 1210.

Figure 12C:
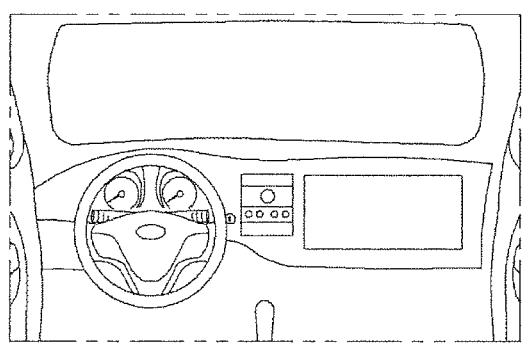
Figure 12C:
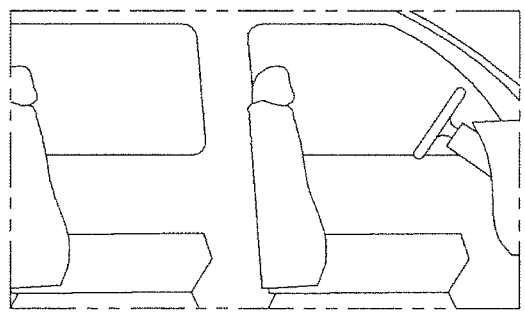

The driver assistance apparatus 100 can detect the size of the animal and provide a control signal for indoor airbag deployment on or off to the protection apparatus 800 on the basis of the detected animal size. When the detected size of the animal 1210 is less than a reference size, the driver assistance apparatus 100 can provide a control signal for indoor airbag deployment off to the protection apparatus 800, as shown in FIG. 12C.

The protection apparatus 800 can control the indoor airbag 805 not to be deployed. When the driver assistance apparatus 100 detects front collision with the animal 1210, the protection apparatus 800 can control the indoor airbag 805 not to be deployed even if collision information acquired by a collision sensor is received.

Figure 12D:
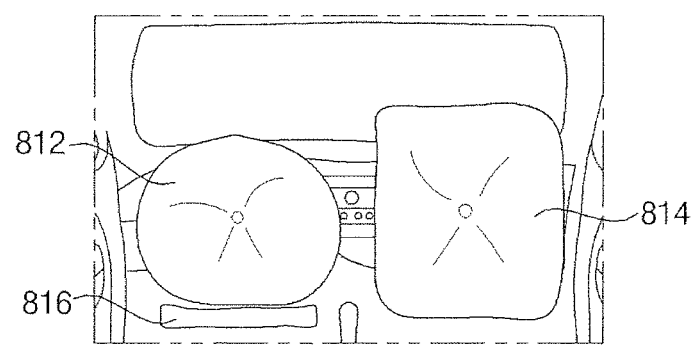
Figure 12D:
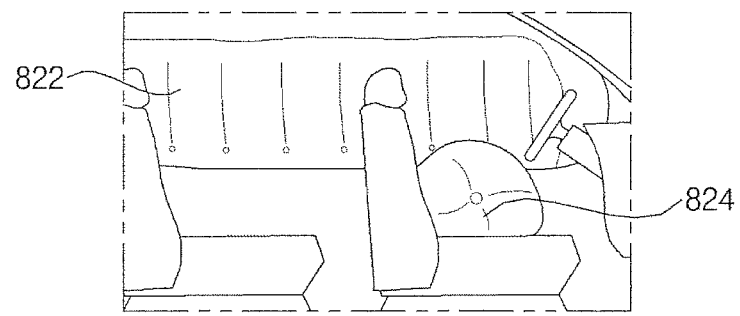

When the detected size of the animal 1210 colliding with the vehicle 700 is greater than the reference size, the driver assistance apparatus 100 can provide a control signal for indoor airbag deployment on to the protection apparatus 800, as shown in FIG. 12D. The protection apparatus 800 can control the indoor airbag 805 to be deployed.

The driver assistance apparatus 100 can provide control signals for front impact prevention airbag deployment on and side impact prevention airbag deployment off to the protection apparatus 800 according to an implementation. The protection apparatus 800 can control the front impact prevention airbag 810 to be deployed and control the side impact prevention airbag 820 not to be deployed.

The weight of an animal is proportional to the size thereof. In addition, impact is proportional to weight. Impact generated when the vehicle collides with a large animal is greater than impact generated when the vehicle collides with a small animal. Accordingly, the processor 170 can provide an indoor airbag deployment on or off control signal in consideration of impact applied to the passenger on the basis of the detected animal size.

FIGS. 13A to 13E illustrate operations of the driver assistance apparatus 100 and the protection apparatus 800 when front or rear collision between the vehicle 700 and an object 1310 or 1315 occurs according to an implementation.

Figure 13A:
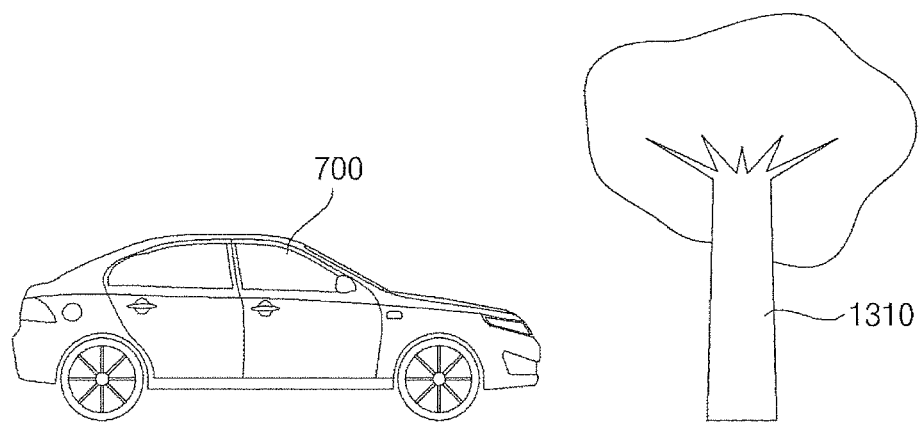
Figure 13B:
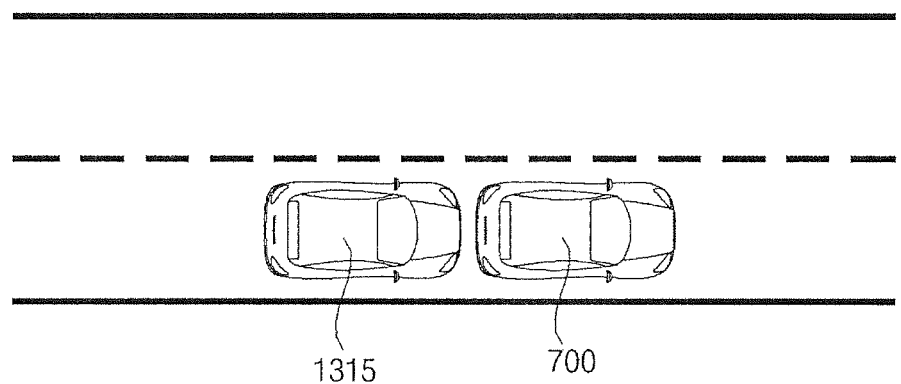
Figure 13C:
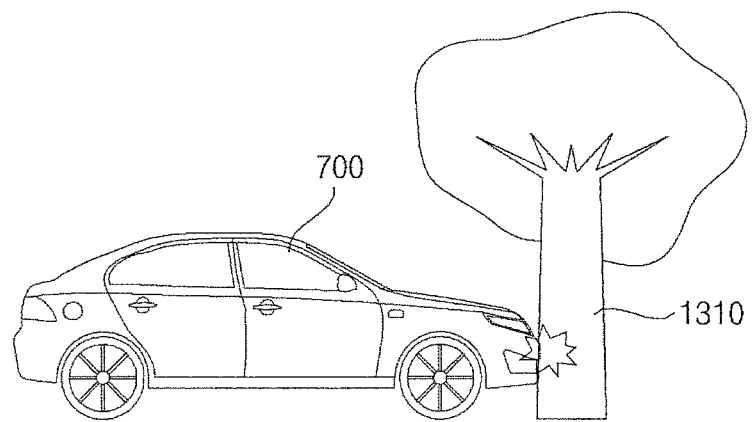

Referring to FIGS. 13A to 13C, the vehicle 700 may collide with the object 1310 or 1315 during driving. While the objects are shown as a street tree 1310 and another vehicle 1315 in the figure, the objects may be a guardrail, a street lamp, a telephone pole and the like, which can collide with the vehicle.

The driver assistance apparatus 100 can acquire an image and detect the object 1310 or 1315 from the acquired image. In addition, the driver assistance apparatus 100 can detect that collision with the object 1310 or 1315 is front or rear collision on the basis of the acquired image.

Upon detection of front or rear collision with the object 1310 or 1315, the driver assistance apparatus 100 can provide control signals for hood lift up off and pedestrian protection airbag deployment off to the protection apparatus 800.

The protection apparatus 800 can control the hood 1020 and the pedestrian protection airbag 830 such that the hood is not lifted and the pedestrian protection airbag is not deployed.

In this manner, unnecessary hood lift up and pedestrian protection airbag deployment can be prevented by detecting the object and collision pattern and controlling hood lift up and pedestrian protection airbag deployment on the basis of the detected object and collision pattern.

Figure 13D:
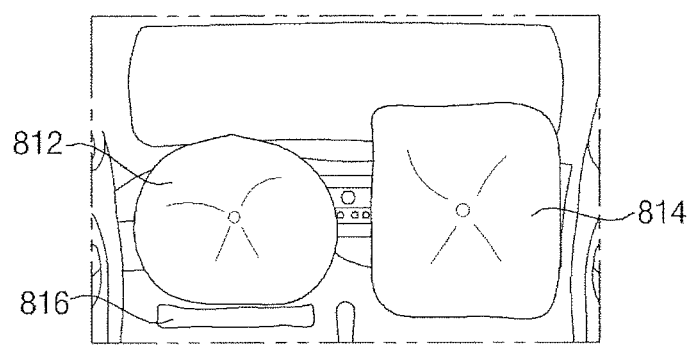
Figure 13D:
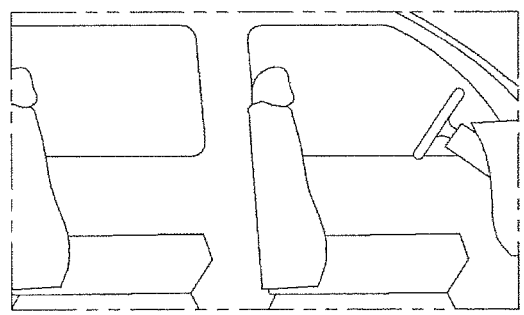

Referring to FIG. 13D, upon detection of front or rear collision with the object 1310 or 1315, the driver assistance apparatus 100 can provide a control signal for front impact prevention airbag deployment on to the protection apparatus 800. In this case, the driver assistance apparatus 100 can provide a control signal for side impact prevention airbag deployment off to the protection apparatus 800.

The protection apparatus 800 can control the front impact prevention airbag 810 to be deployed and control the side impact prevention airbag 820 not to be deployed.

Figure 13E:
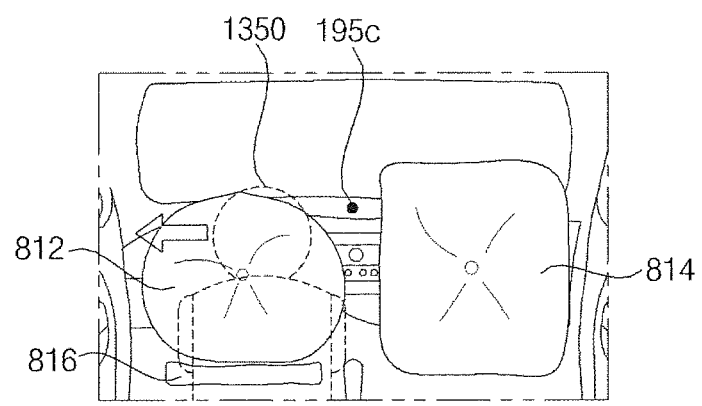
Figure 13E:
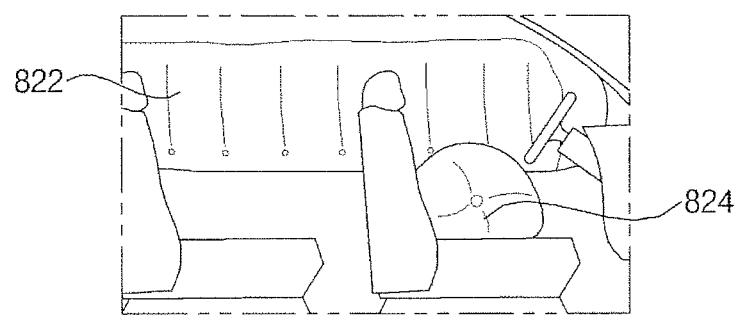

Referring to FIG. 13E, when front or rear collision with the object 1310 or 1315 is detected and movement of the position of the head 1350 of the passenger of the vehicle 700 to the right or left of the vehicle direction of travel is sensed by the internal camera 195c, the driver assistance apparatus 100 can provide a control signal for side impact prevention airbag deployment on to the protection apparatus 800.

Even when front or rear collision with the object 1310 or 1315 occurs, if the head 1350 of the passenger is moved to the right or left of the vehicle direction of travel, the passenger may collide with an object located at the side of the passenger. Accordingly, the protection apparatus 800 can protect the passenger by deploying the side impact prevention airbag 820 according to a control signal of the driver assistance apparatus 100.

Figure 14A:
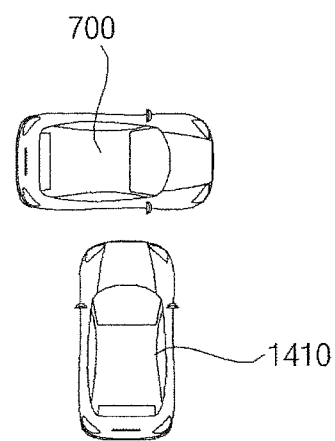
Figure 14B:
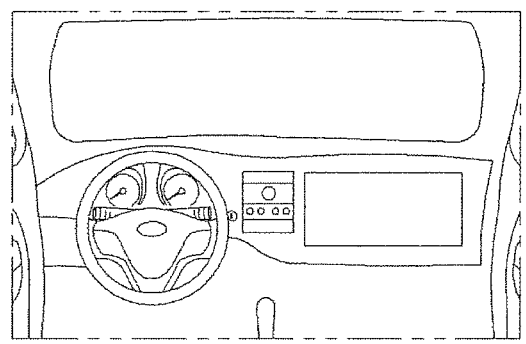
Figure 14B:
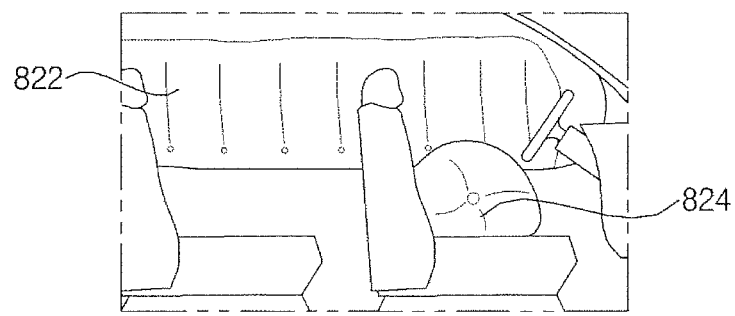
Figure 14C:
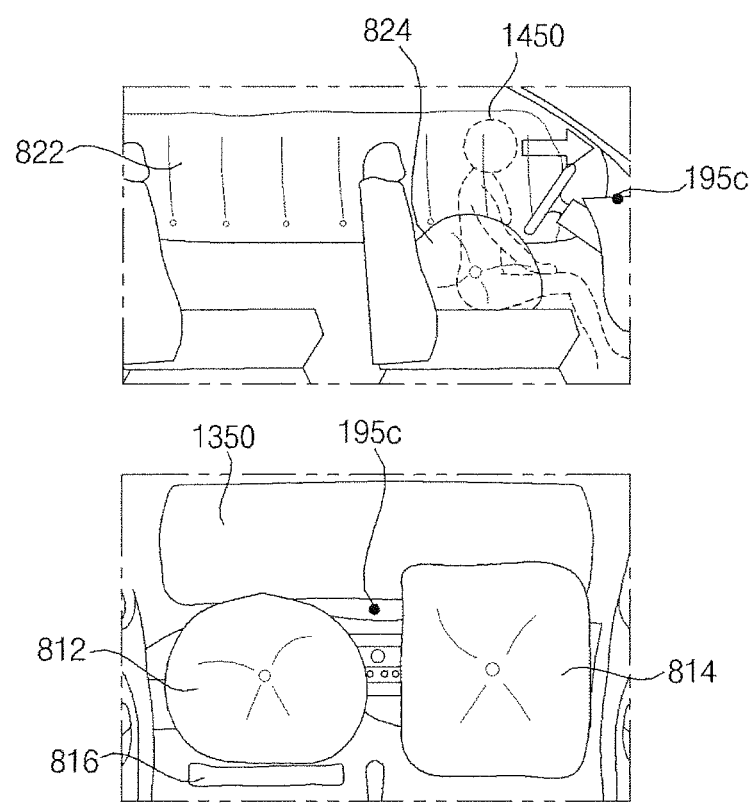

FIGS. 14A to 14C illustrate operations of the driver assistance apparatus 100 and the protection apparatus 800 when side collision between the vehicle 700 and an object 1410 occurs according to an implementation.

Referring to FIG. 14A, the vehicle 700 may collide with the object 1410 during driving. In this case, the driver assistance apparatus 100 can acquire an image and detect the object 1410 from the acquired image. In addition, the driver assistance apparatus 100 can detect that collision with the object 1410 is side collision on the basis of the acquired image.

Upon detection of side collision with the object 1410, the driver assistance apparatus 100 can provide control signals for hood lift up off and pedestrian protection airbag deployment off to the protection apparatus 800.

The protection apparatus 800 can control the hood 1020 and the pedestrian protection airbag 830 such that the hood is not lifted and the pedestrian protection airbag is not deployed.

In this manner, unnecessary hood lift up and pedestrian protection airbag deployment can be prevented by detecting the object and collision pattern and controlling hood lift up and pedestrian protection airbag deployment on the basis of the detected object and collision pattern.

Referring to FIG. 14B, upon detection of side collision with the object 1410, the driver assistance apparatus 100 can provide a control signal for front impact prevention airbag deployment off to the protection apparatus 800. In this case, the driver assistance apparatus 100 can provide a control signal for side impact prevention airbag deployment on to the protection apparatus 800.

The protection apparatus 800 can control the front impact prevention airbag 810 not to be deployed and control the side impact prevention airbag 820 to be deployed.

Referring to FIG. 14C, when side collision with the object 1410 is detected and forward movement of the position of the head 1450 of the passenger of the vehicle 700 is sensed by the internal camera 195c, the driver assistance apparatus 100 can provide a control signal for front impact prevention airbag deployment on to the protection apparatus 800.

Even when side collision with the object 1410 occurs, if the head 1350 of the passenger is moved forward, the protection apparatus 800 can protect the passenger by deploying the front impact prevention airbag 810 according to a control signal of the driver assistance apparatus 100.

Figure 15A:
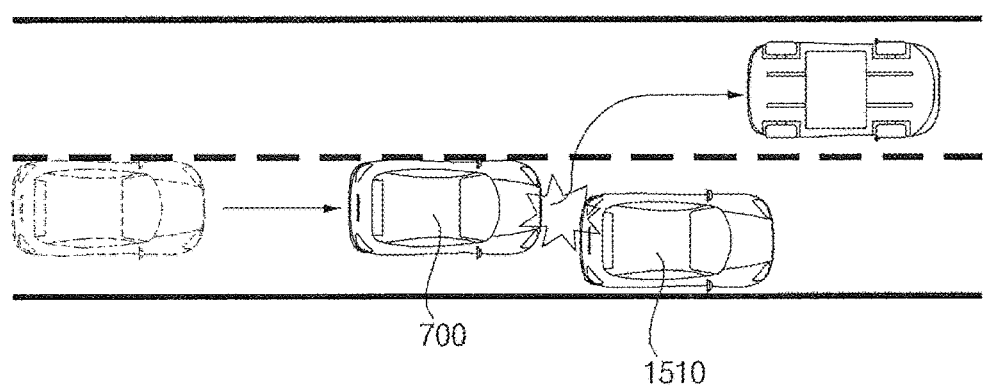
Figure 15B:
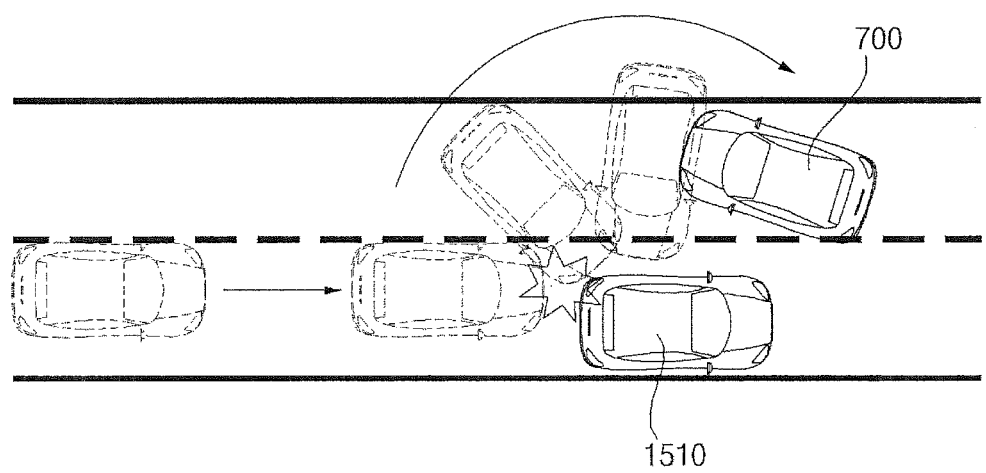
Figure 15C:
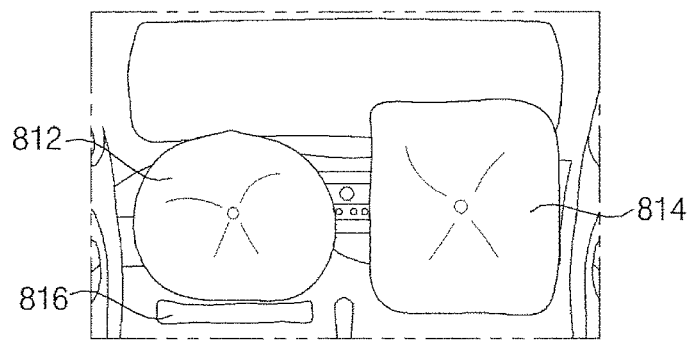
Figure 15C:
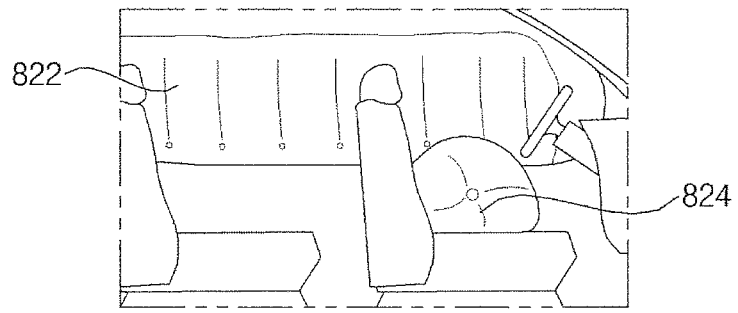

FIGS. 15A to 15C illustrate operations of the driver assistance apparatus 100 and the protection apparatus 800 when front offset collision between the vehicle 700 and an object 1510 occurs according to an implementation.

Referring to FIGS. 15A to 15C, front offset collision between the vehicle 700 and the object 1510 may occur while the vehicle 700 is traveling. Here, the object 1510 may be another vehicle.

The driver assistance apparatus 100 can acquire an image and detect the object 1510 from the acquired image. In addition, the driver assistance apparatus 100 can detect that collision with the object 1410 is front offset collision on the basis of the acquired image.

Upon detection of front offset collision with the object 1510, the driver assistance apparatus 100 can provide control signals for hood lift up off and pedestrian protection airbag deployment off to the protection apparatus 800. The protection apparatus 800 can control the hood 1020 and the pedestrian protection airbag 830 such that the hood is not lifted and the pedestrian protection airbag is not deployed.

In this manner, unnecessary hood lift up and pedestrian protection airbag deployment can be prevented by detecting the object and collision pattern and controlling hood lift up and pedestrian protection airbag deployment on the basis of the detected object and collision pattern.

After front offset collision with the object 1510, the vehicle 700 may turn over or rotate on an axis in the height direction H. The driver assistance apparatus 100 can detect rollover or rotation on the basis of rotation detected from the acquired image.

Referring to FIG. 15C, upon detection of front offset collision with the object 1510, the driver assistance apparatus 100 can provide a control signal for indoor airbag deployment on to the protection apparatus 800. Then, the protection apparatus 800 can deploy the indoor airbag 805.

Since the vehicle 700 may turn over or rotate after front offset collision with another vehicle, safety of the passenger is secured by deploying the indoor airbag 805.

Figure 16A:
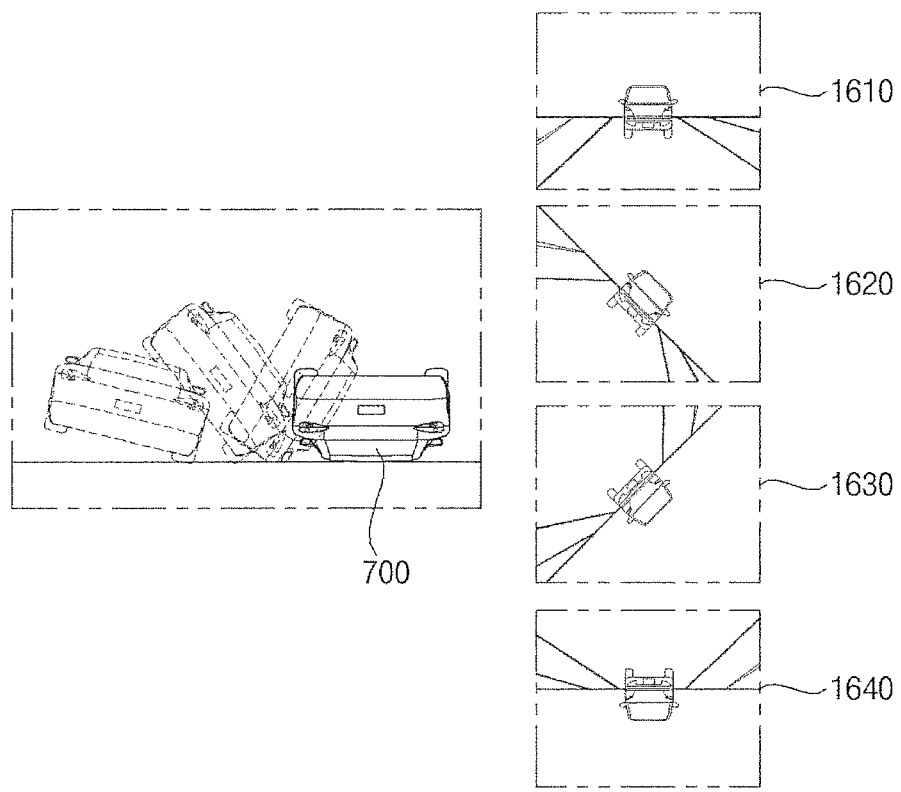
Figure 16B:
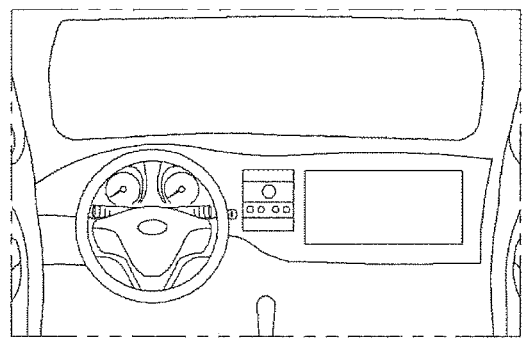
Figure 16B:
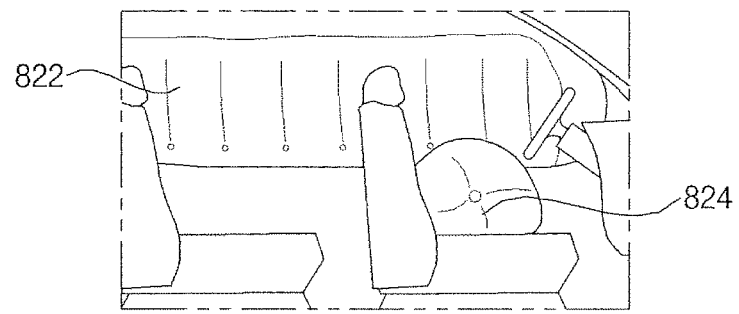

FIGS. 16A and 16B illustrate operations of the driver assistance apparatus 100 and the protection apparatus 800 when a rollover accident occurs according to an implementation.

Referring to FIG. 16A, the vehicle 700 may turn over while traveling.

The driver assistance apparatus 100 can determine that a rollover accident has occurred upon detection of rotation of the vehicle 700 in a predetermined direction from an acquired image. For example, when rotations 1610, 1620, 1630 and 1640 on an axis in the overall length direction L are detected through rotation detected from the image, the processor 170 can determine that the rollover accident has occurred.

Upon determination of occurrence of the rollover accident, the driver assistance apparatus 100 can provide control signals for hood lift up off and pedestrian protection airbag deployment off to the protection apparatus 800. The protection apparatus 800 can control the hood 1020 and the pedestrian protection airbag 830 such that the hood 1020 is not lifted and the pedestrian protection airbag is not deployed.

In this manner, unnecessary hood lift up and pedestrian protection airbag deployment can be prevented by detecting the object and collision pattern and controlling hood lift up and pedestrian protection airbag deployment on the basis of the detected object and collision pattern.

Referring to FIG. 16B, upon determination of occurrence of the rollover accident, the driver assistance apparatus 100 can provide a control signal for front impact prevention airbag deployment off to the protection apparatus 800. In addition, the driver assistance apparatus 100 can provide a control signal for side impact prevention airbag deployment on to the protection apparatus 800. Then, the protection apparatus 800 can control the front impact prevention airbag 810 not to be deployed and control the side impact prevention airbag 820 to be deployed.

Figure 17:
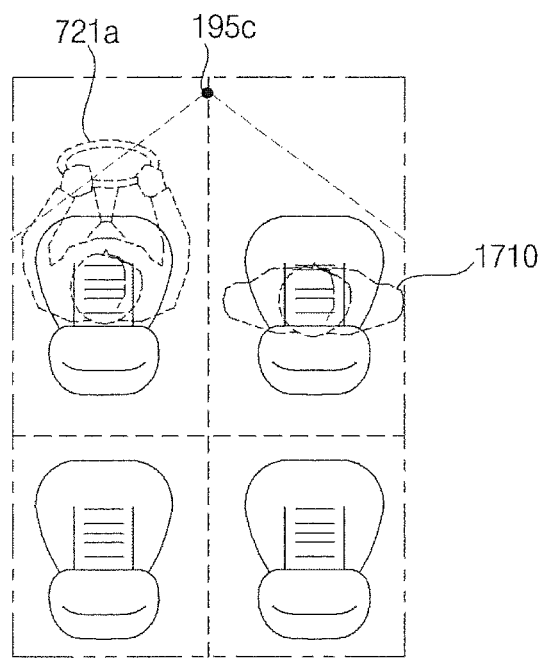
FIG. 17 is a diagram illustrating an example of an indoor airbag deploying operation based on detecting a passenger state.

FIG. 17 is a view for explaining indoor airbag deployment operation on the basis of a state of a passenger according to an implementation.

The driver assistance apparatus 100 may include the internal camera 195c. The internal camera 195c can photograph the inside of the vehicle 700.

The driver assistance apparatus 100 can detect passengers from an image of the inside of the vehicle, acquired by the internal camera 195c. Here, the passengers may be seated on the driver seat, passenger seat and back seat.

The driver assistance apparatus 100 can provide a control signal for indoor airbag on or off to the protection apparatus 800 on the basis of the state of the detected passengers. For example, when a passenger sitting on the passenger seat is not detected or the sitting height of a detected passenger sitting on the passenger seat is less than a reference value, the driver assistance apparatus 100 can provide a control signal for passenger seat airbag deployment off.

For example, when a passenger sitting on the passenger seat is not detected, the driver assistance apparatus 100 can provide a control signal for controlling the side impact prevention airbag for a passenger seat user not to be deployed. When a passenger sitting on the back seat is not detected, the driver assistance apparatus 100 can provide a control signal for controlling the side impact prevention airbag for a back seat user not to be deployed. The protection apparatus 800 can deploy the indoor airbag or not according to a control signal provided by the driver assistance apparatus 100.

Implementations described herein may be implemented as code that can be written to a computer-readable recording medium and can thus be read by a computer. The computer-readable recording medium may be any type of recording device in which data can be stored in a computer-readable manner. Examples of the computer-readable recording medium include a HDD (Hard Disc Drive), a SSD (Solid State Disc), SDD (Silicon Disc Drive), a ROM, a RAM, a CD-ROM, a magnetic tape, a floppy disk, optical data storage, and a carrier wave, e.g., data transmission over the Internet. The computer may include the processor 170 or the controller 770. Although the examples above have been disclosed for illustrative purposes, those skilled in the art will appreciate that various modifications, additions and substitutions are possible, without departing from the scope and spirit of the invention as disclosed in the accompanying claims.

What is claimed is:

1. A driver assistance apparatus for a vehicle, comprising:
   an object detection sensor configured to acquire data in a driving direction of the vehicle or around the vehicle; and
   at least one processor configured to:
   detect, based on the acquired data, an object;
   determine, based on the acquired data, at least one attribute of the detected object;
   detect that the vehicle has collided with the object;
   determine, based on the detection that the object has collided with the vehicle and the at least one attribute of the object, whether to perform at least one of a hood lift-up operation or a pedestrian protection airbag deployment operation;
   provide a control signal to perform at least one of the hood lift-up operation or the pedestrian protection airbag deployment operation based on the determination of whether to perform the at least one of the hood lift-up operation or the pedestrian protection airbag deployment operation;
   provide, based on the detection that the object has collided with the vehicle, a control signal to perform indoor airbag deployment,
   wherein the at least one processor is further configured to:
      determine, based on the acquired data, that the object is an animal;
      determine, based on the acquired data, that the collision is a front collision;
      detect a size of the animal; and
      provide, based on the determination that the object is an animal and that the collision is a front collision, a control signal to perform indoor airbag deployment according to the detected size of the animal, and
   wherein the at least one processor is further configured to:
      based on the detected size of the animal being less than a threshold size, provide a control signal to deactivate indoor airbag deployment; and
      based on the detected size of the animal being greater than the threshold size, provide a control signal to activate indoor airbag deployment.

2. The driver assistance apparatus for a vehicle of claim 1, wherein the at least one processor is configured to:
   determine, based on the acquired data, a front-view image or an around-view image of the vehicle; and
   detect, based on the front-view image or the around-view image of the vehicle, that the vehicle has collided with the object.

3. The driver assistance apparatus for a vehicle of claim 1, wherein the at least one processor is configured to:
   determine, based on the acquired data, that the object is a person or a two-wheeled vehicle with a passenger riding thereon;
   determine, based on the acquired data, that the collision is a front collision; and
   provide, based on the determination that the object is a person or a two-wheeled vehicle with a passenger riding thereon and that the collision is a front collision, the control signal to perform at least one of the hood lift-up operation or the pedestrian protection airbag deployment operation.

4. The driver assistance apparatus for a vehicle of claim 1, wherein the at least one processor is configured to:
   provide, based on the determination that the object is an animal and that the collision is a front collision, a control signal to prevent the hood lift-up operation or the pedestrian protection airbag deployment operation.

5. The driver assistance apparatus for a vehicle of claim 1, wherein the at least one processor is configured to:
   determine, based on the acquired data, that the object is an inanimate object;
   determine, based on the acquired data, that the collision is a front collision; and
   provide, based on the determination that the object is an inanimate object and that the collision is a front collision, at least one control signal to prevent the hood lift-up operation or the pedestrian protection airbag deployment operation.

6. The driver assistance apparatus for a vehicle of claim 5, wherein the at least one processor is configured to:
   determine, based on the acquired data, that the collision is one of a front collision, a rear collision, a side collision, or a front offset collision.

7. The driver assistance apparatus for a vehicle of claim 1, wherein the at least one processor is configured to:
   determine, based on the acquired data, a front-view image or an around-view image of the vehicle;
   detect, based on the front-view image or the around-view image of the vehicle, that the vehicle has had a rollover accident; and provide, based on the detection that the vehicle has had a rollover accident, a control signal to prevent the hood lift-up operation or the pedestrian protection airbag deployment operation.

8. The driver assistance apparatus for a vehicle of claim 1, wherein the at least one processor is configured to:
determine, based on the acquired data, a front-view image or an around-view image of the vehicle; and
detect that the vehicle has collided with the object based on the front-view image or the around-view image of the vehicle.

9. The driver assistance apparatus for a vehicle of claim 1, wherein the at least one processor is configured to:
determine, based on the acquired data, that the object is a person or a two-wheeled vehicle with a passenger riding thereon;
determine, based on the acquired data, that the collision is a front collision; and
provide, based on the determination that the object is a person or a two-wheeled vehicle with a passenger riding thereon and that the collision is a front collision, a control signal to disable deployment of an indoor airbag.

10. The driver assistance apparatus for a vehicle of claim 9, further comprising an interface configured to receive information regarding a speed of the vehicle,
wherein the at least one processor is configured to:
determine, based on the information regarding the speed of the vehicle, that the speed of the vehicle exceeds a reference value; and
provide, based on the determination that the speed of the vehicle exceeds the reference value, a control signal to perform indoor airbag deployment.

11. The driver assistance apparatus for a vehicle of claim 1, wherein performing the indoor airbag deployment comprises performing a front impact airbag deployment and a side impact airbag deployment.

12. The driver assistance apparatus for a vehicle of claim 11, wherein the at least one processor is configured to:
determine, based on the acquired data, that the object is an inanimate object;
determine, based on the acquired data, that the collision is a front collision or a rear collision; and
provide, based on the determination that the object is an inanimate object and that the collision is a front collision or a rear collision, a control signal to perform front impact airbag deployment and a control signal to disable side impact airbag deployment.

13. The driver assistance apparatus for a vehicle of claim 12, further comprising an internal object detection sensor configured to sense a position of a head of a passenger of the vehicle,
wherein the at least one processor is configured to:
determine, based on the sensed position of the head of the passenger of the vehicle, that the position of the head of the passenger has moved to the right or to the left relative to a direction of travel of the vehicle; and
provide, based on the determination that the position of the head of the passenger has moved to the right or to the left relative to the direction of travel of the vehicle, a control signal to perform side impact airbag deployment.

14. The driver assistance apparatus for a vehicle of claim 11, wherein the at least one processor is configured to:
determine, based on the acquired data, that the object is an inanimate object;
determine, based on the acquired data, that the collision is a side collision; and
provide, based on the determination that the object is an inanimate object and that the collision is a side collision, a control signal to disable front impact airbag deployment and a control signal to perform side impact airbag deployment.

15. The driver assistance apparatus for a vehicle of claim 11, wherein the at least one processor is configured to:
determine, based on the acquired data, that the object is an inanimate object;
determine, based on the acquired data, that the collision is a front offset collision; and
provide, based on the determination that the object is an inanimate object and that the collision is a front offset collision, at least one control signal to perform front impact airbag deployment and to perform side impact airbag deployment.

16. The driver assistance apparatus for a vehicle of claim 11, wherein the at least one processor is configured to:
determine, based on the acquired data, a front-view image or an around-view image of the vehicle;
detect, based on the front-view image or the around-view image of the vehicle, that the vehicle has had a rollover accident; and
provide, based on the detection that the vehicle has had a rollover accident, a control signal to disable front impact airbag deployment and a control signal to perform side impact airbag deployment.

17. The driver assistance apparatus for a vehicle of claim 1, further comprising an interior object detection sensor configured to acquire data regarding an interior of the vehicle,
wherein the at least one processor is configured to:
detect, based on the acquired data regarding the interior of the vehicle, a passenger in the vehicle;
determine, based on the acquired data regarding the interior of the vehicle, a state of the detected passenger; and
provide, based on the determined state of the detected passenger, a first control signal to perform indoor airbag deployment or a second control signal to disable the indoor airbag deployment.

18. The driver assistance apparatus for a vehicle of claim 17, wherein the at least one processor is configured to:
determine that all passenger seats of the vehicle are unoccupied or that the sitting height of a passenger detected in a passenger seat of the vehicle is less than a reference value; and
provide, based on the determination that all passenger seats of the vehicle are unoccupied or that the sitting height of a passenger detected in a passenger seat of the vehicle is less than a reference value, a control signal to prevent deployment of a passenger seat airbag included in the indoor airbag.

19. A vehicle comprising:
a plurality of wheels;
a power source configured to drive the plurality of wheels; and
a driver assistance apparatus for the vehicle, comprising:
an object detection sensor configured to acquire data in a driving direction of the vehicle or around the vehicle; and
at least one processor configured to:
detect, based on the acquired data, an object;
determine, based on the acquired data, at least one attribute of the detected object;

detect that the vehicle has collided with the object;

determine, based on the detection that the object has collided with the vehicle and the at least one attribute of the object, whether to perform at least one of a hood lift-up operation or a pedestrian protection airbag deployment operation;

provide a control signal to perform at least one of the hood lift-up operation or the pedestrian protection airbag deployment operation based on the determination of whether to perform the at least one of the hood lift-up operation or the pedestrian protection airbag deployment operation;

provide, based on the detection that the object has collided with the vehicle, a control signal to perform indoor airbag deployment, wherein the at least one processor is further configured to:

determine, based on the acquired data, that the object is an animal;

determine, based on the acquired data, that the collision is a front collision;

detect a size of the animal; and provide, based on the determination that the object is an animal and that the collision is a front collision, a control signal to perform indoor airbag deployment according to the detected size of the animal, and wherein the at least one processor is further configured to:

based on the detected size of the animal being less than a threshold size, provide a control signal to deactivate indoor airbag deployment; and based on the detected size of the animal being greater than the threshold size, provide a control signal to activate indoor airbag deployment.

20. The vehicle of claim 19, further comprising:

a collision sensor configured to provide information regarding a collision involving the vehicle; and a controller configured to:

determine that the driver assistance apparatus provides a first control signal to disable hood lift-up or a second control signal to disable pedestrian protection airbag deployment; and based on the determination that the driver assistance apparatus provides the first control signal to disable hood lift-up or the second control signal to disable pedestrian protection airbag deployment, process the first control signal or the second control signal prior to receiving the information on collision from the collision sensor.

* * * * *